(12) United States Patent
Greer

(10) Patent No.: US 8,805,897 B2
(45) Date of Patent: Aug. 12, 2014

(54) METHOD AND SYSTEM FOR STORAGE

(75) Inventor: Kevin Glen Roy Greer, Mississauga (CA)

(73) Assignee: Redknee Inc., Mississauga (CA)

( * ) Notice: Subject to any disclaimer, the term of this patent is extended or adjusted under 35 U.S.C. 154(b) by 636 days.

(21) Appl. No.: 12/746,852

(22) PCT Filed: Dec. 13, 2007

(86) PCT No.: PCT/CA2007/002292
§ 371 (c)(1),
(2), (4) Date: Jun. 8, 2010

(87) PCT Pub. No.: WO2009/073949
PCT Pub. Date: Jun. 18, 2009

(65) Prior Publication Data
US 2010/0274829 A1    Oct. 28, 2010

(51) Int. Cl.
*G06F 17/30* (2006.01)
(52) U.S. Cl.
USPC .............................................. 707/822
(58) Field of Classification Search
CPC ........................... G06F 7/5332; G06F 9/30069
USPC ........... 707/822, 688, 704, 694, 814, 999.205
See application file for complete search history.

(56) References Cited

U.S. PATENT DOCUMENTS

| 5,664,189 | A | | 9/1997 | Wilcox et al. | |
| 5,752,243 | A | * | 5/1998 | Reiter et al. | 1/1 |
| 5,860,124 | A | * | 1/1999 | Matthews et al. | 711/165 |
| 7,844,632 | B2 | * | 11/2010 | Zhou et al. | 707/796 |
| 2002/0194244 | A1 | * | 12/2002 | Raventos | 709/101 |
| 2004/0001408 | A1 | * | 1/2004 | Propps et al. | 369/53.17 |
| 2004/0044840 | A1 | * | 3/2004 | Wong | 711/105 |
| 2006/0136500 | A1 | | 6/2006 | Hua et al. | |
| 2006/0173956 | A1 | * | 8/2006 | Ulrich et al. | 709/203 |
| 2007/0033375 | A1 | * | 2/2007 | Sinclair et al. | 711/203 |
| 2007/0156998 | A1 | * | 7/2007 | Gorobets | 711/170 |
| 2007/0186032 | A1 | * | 8/2007 | Sinclair et al. | 711/103 |
| 2010/0110935 | A1 | * | 5/2010 | Tamassia et al. | 370/256 |
| 2010/0223423 | A1 | * | 9/2010 | Sinclair et al. | 711/103 |

FOREIGN PATENT DOCUMENTS

WO    2007/019175 A2    2/2007

OTHER PUBLICATIONS

European Patent Application No. 07 85 5574 Search Report dated Jan. 10, 2011.

* cited by examiner

*Primary Examiner* — Mohammed R Uddin
(74) *Attorney, Agent, or Firm* — Gardner, Linn, Burkhart & Flory, LLP

(57) ABSTRACT

A method and system for storage is provided that in one embodiment includes a store process that continually appends data to the end of a data file and without deleting the data file. Additions, changes and deletions to data are managed by adding new data to the file and changing appropriate pointers in the data file to reflect the new data. Various application programming interfaces are also provided so that the store process can operate transparently to higher level applications. Various plug-ins are also provided so that the store process can utilize different types, configurations and numbers of storage devices.

20 Claims, 25 Drawing Sheets

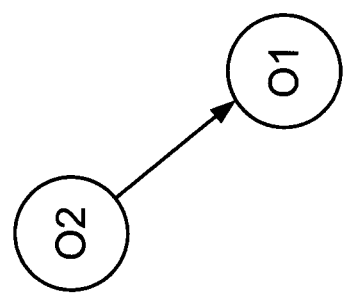
Fig. 6
T-1

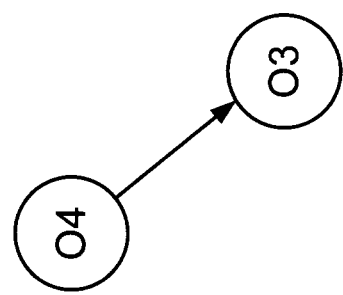
Fig. 9
T-2

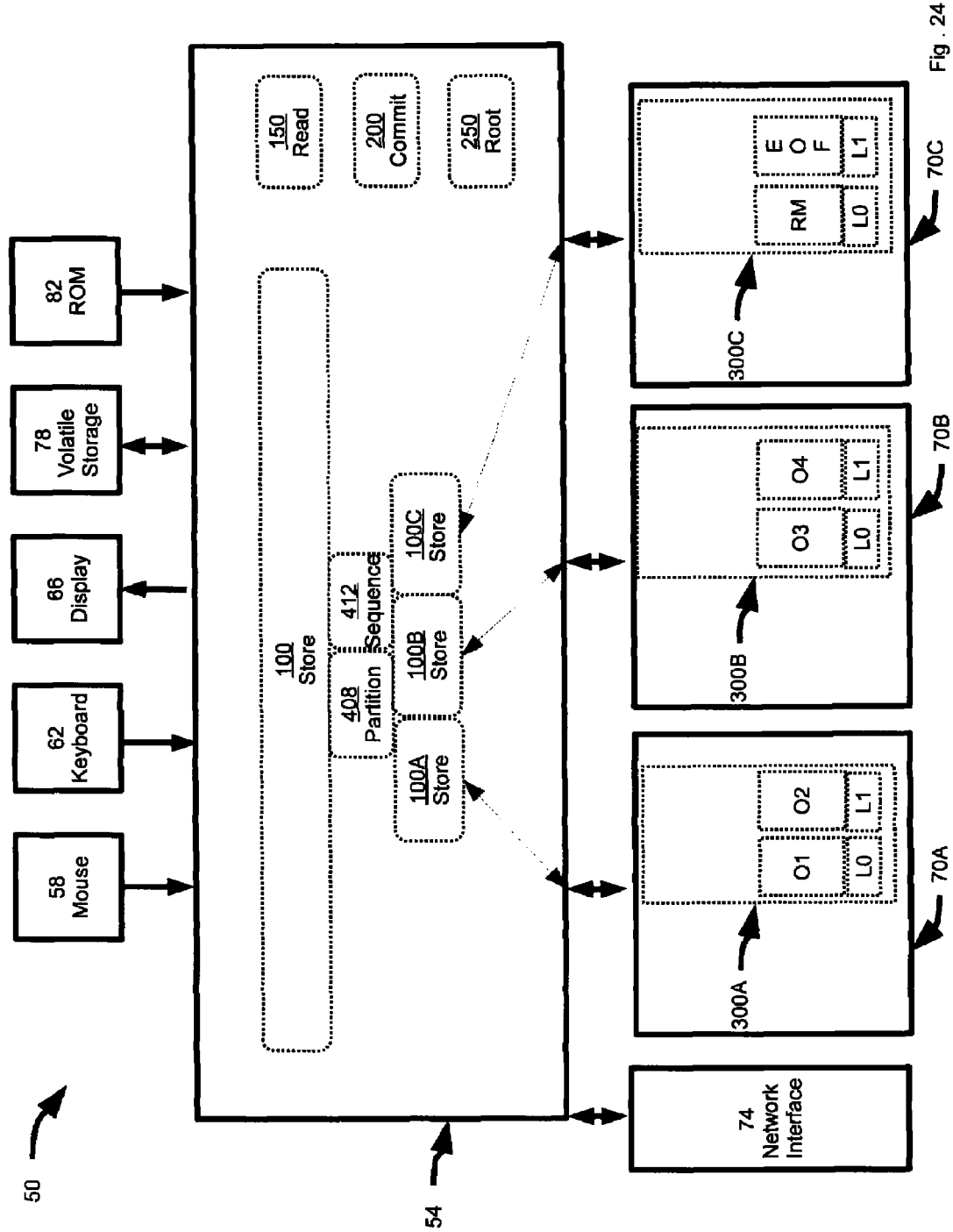

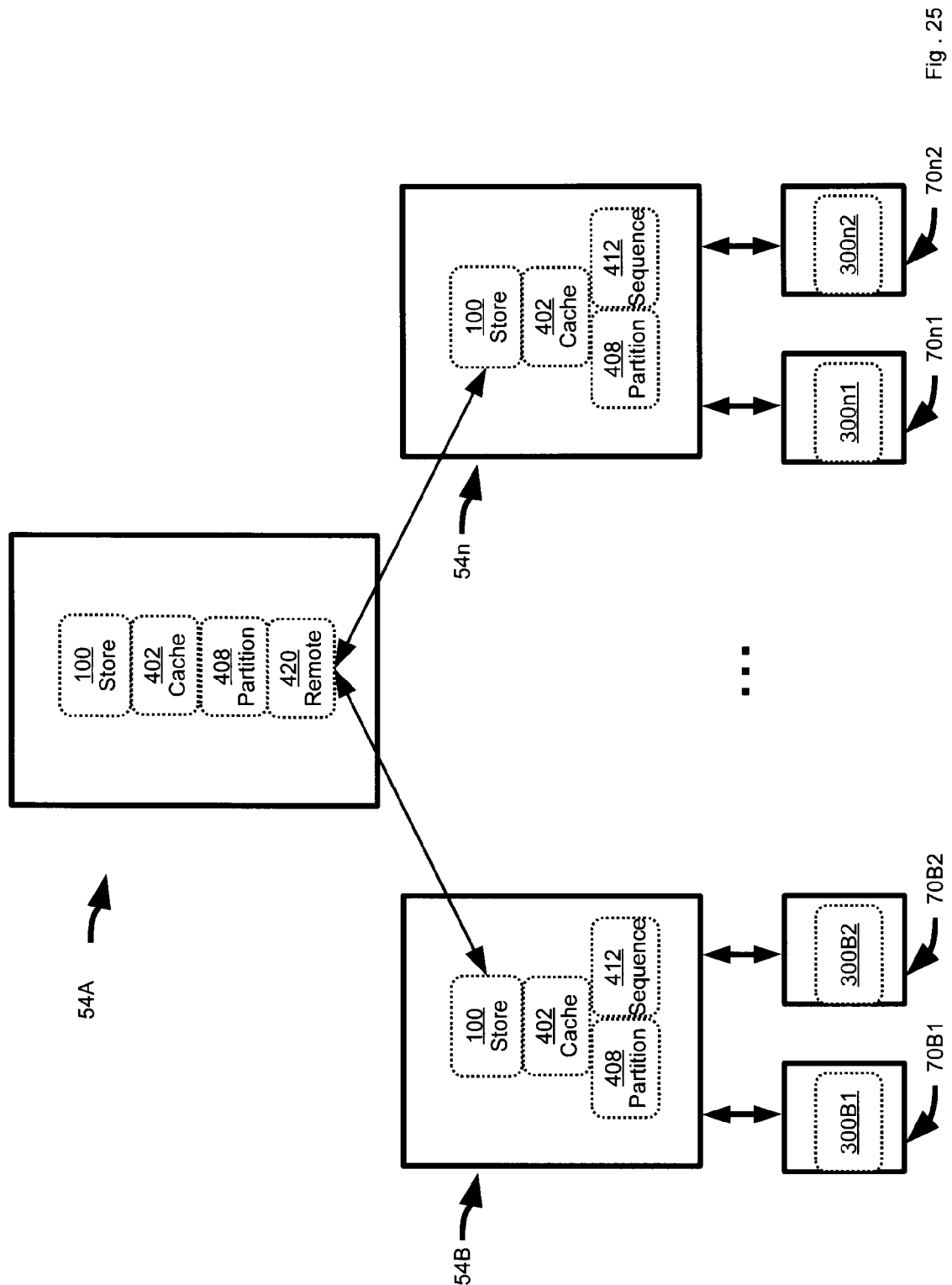

METHOD AND SYSTEM FOR STORAGE

FIELD

This specification relates generally to computer hardware and software architecture, and more particularly relates to a method and system for storage.

BACKGROUND

Relational databases were originally developed at a time when the speed of central processing units ("CPU") were relatively slow, the amount of random access memory was relatively small, the size of hard disks was relatively small, but the speed at which hard disks was accessed was relatively fast. Interestingly, hardware advancements have now lead to a different paradigm, where CPUs are relatively fast, the amount of random access memory is relatively high, the size of hard disks is relatively large, but the speed at which hard disks are accessed is relatively slow. This new paradigm means that where large amounts of data are written in relatively small blocks across a large hard disk, the speed at which that data can be accessed is somewhat limited.

SUMMARY

A method and system for storage is provided that in one embodiment includes a store process that continually appends data to the end of a data file and without deleting the data file. Changes to data structures are managed by adding new data to the file and changing appropriate pointers in the data file to reflect the new data. Various application programming interfaces are also provided so that the store process can operate transparently to higher level applications. Various plug-ins are also provided so that the store process can utilize different types, configurations and numbers of storage devices.

An aspect of the specification provides a method for storing comprising:
  receiving a write command including an object to be written;
  seeking to an end of a file;
  defining a write location at or adjacent to said end of file;
  writing said object at said write location;
  defining an object identifier associated with said write location;
  redefining said end of file after said write location;
  wherein said method is invoked for:
    additions of objects to said file;
    deletions of objects from said file; and
    changes of objects to said file.

Another aspect of the specification provides a skip-list data structure readable by a processing unit. The processing unit is configured to perform operations on contents of the data structure. The skip list data structure comprises a root object, a first child object and a plurality of additional child objects. The root object includes a pointer from said root object to said first child object. The root object also includes a pointer from the root object to every other one of the additional child objects. The every other one of said additional child objects including a pointer to one of each of said additional child objects to which said root object does not point.

BRIEF DESCRIPTION OF THE DRAWINGS

FIG. 6 shows an exemplary data structure that can be stored using the method of storage in FIG. 2.

FIG. 9 shows another exemplary data structure that can be stored using the method of storage in FIG. 2.

FIG. 24 shows a variation on the system of FIG. 15 with a plurality of different plug-ins and a plurality of storage devices instead of just one storage device.

FIG. 25 shows a variation on the system of FIG. 15 with a plurality of different processors and different plug-in configurations associated with each.

DETAILED DESCRIPTION OF THE EMBODIMENTS

Figure 1:
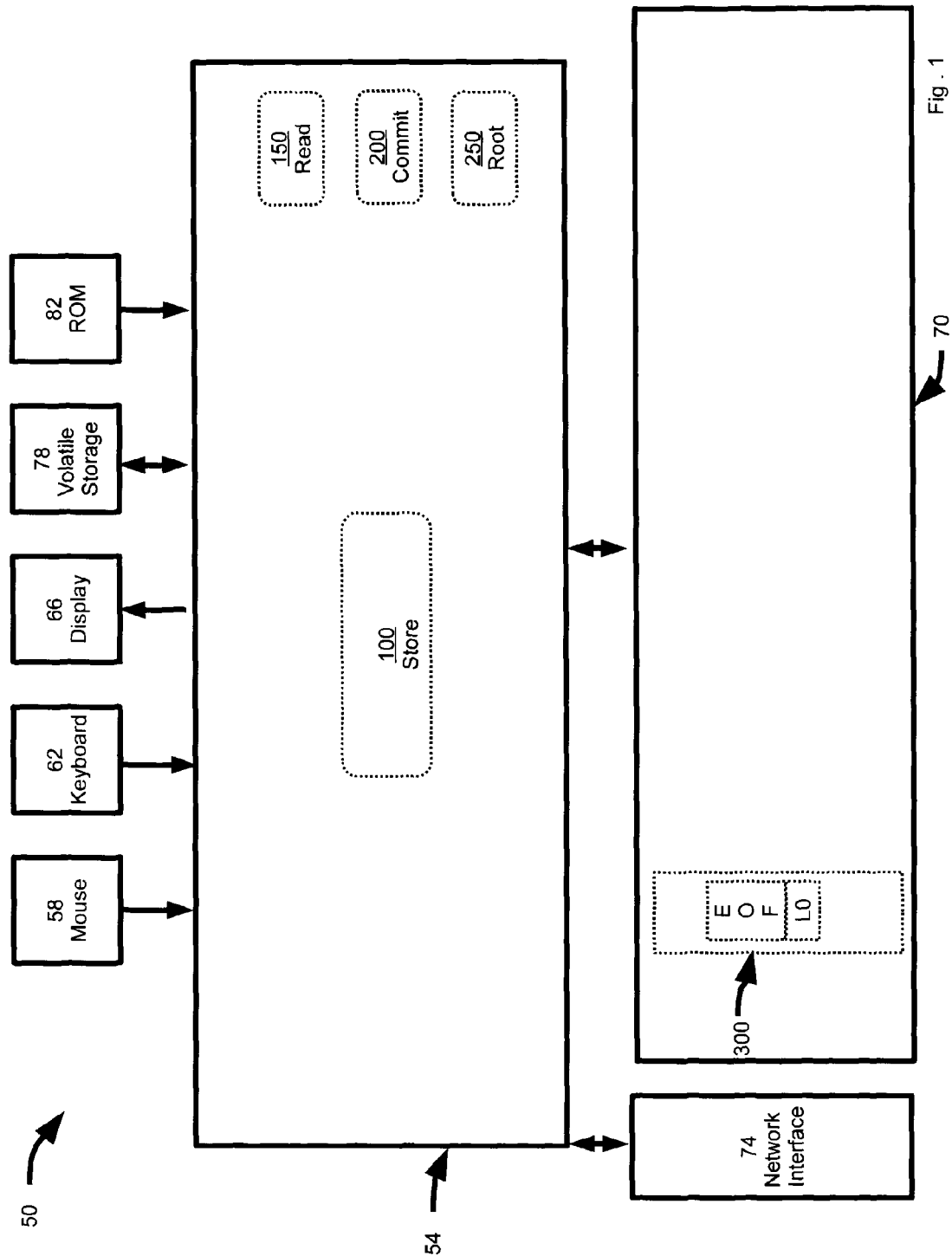
FIG. 1 shows a schematic representation of a system for storage.

Referring now to FIG. 1, a system for storage is indicated generally at 50. System 50 can be based on a now-known or future-conceived computing environment. To provide an example, FIG. 1 shows a block diagram representing exemplary components of system 50. System 50 thus includes a processor 54 (which can also be referred to as a central processing unit) which interconnects input devices, if present, (e.g. a mouse 58 and keyboard 62) and output devices, if present, (e.g. a display 66). Processor 54 can be implemented, of course, as a plurality of processors or one or more multi-core processors. Processor 54 is also connected to a persistent storage device 70. Persistent storage device 70 can be implemented using, for example, a hard disc drive, a redundant array of inexpensive discs ("RAID"), or the like, and/or can include other programmable read only memory ("PROM") technology, a removable "smart card" and/or can comprised combinations of the foregoing.

System 50 also optionally includes a network interface 74 that connects processor 54 to a network (not shown), which in turn can connect to one or more additional persistent storage devices (not shown) that are similar in function to persistent storage device 70.

System 50 also includes volatile storage 78, which can be implemented as random access memory ("RAM"), which can be used to temporarily store applications and data as they are being used by processor 54. System 50 also includes read only memory ("ROM") 82 which contains a basic operating system containing rudimentary programming instructions, commonly known as a Basic Input/Output System ("BIOS") that are executable by processor 54 when system 50 is initially powered so that a higher level operating system and applications can be loaded and executed on processor 54. Collectively, one can view processor 54, volatile storage device and ROM 82 as a microcomputer. It should now be apparent that system 50 can be based on the structure and functionality of a commercial server such as a Sun Fire X4450 Server from Sun Microsystems Inc., of Palo Alto, USA, but it is to be stressed that this is a purely exemplary server, as server 50 (and other elements of system 50a and its variants) could also be based on any type of computing device including from other manufacturers.

The microcomputer implemented on system 50 is thus configured to store and execute the requisite BIOS, operating system and applications to provide the desired functionality of system 50. In particular, system 50 is configured so that a plurality of processes is executable on processor 54. In FIG. 1, processor 54 is represented as configured to execute the following processes: store 100, read 150, commit 200 and root 250 each of which can be invoked by commands entered via keyboard 62 and/or via other processes (not shown) executing on processor 54. Also in FIG. 1, persistent storage 70 is shown as maintaining a file 300 that can be operated upon by store 100, read 150, commit 200 and root 250 as will be discussed in greater detail below. File 300 in FIG. 1 is shown as being "empty", only including an end-of-file marker EOF, which is located at Location zero L0 within file 300.

Figure 2:
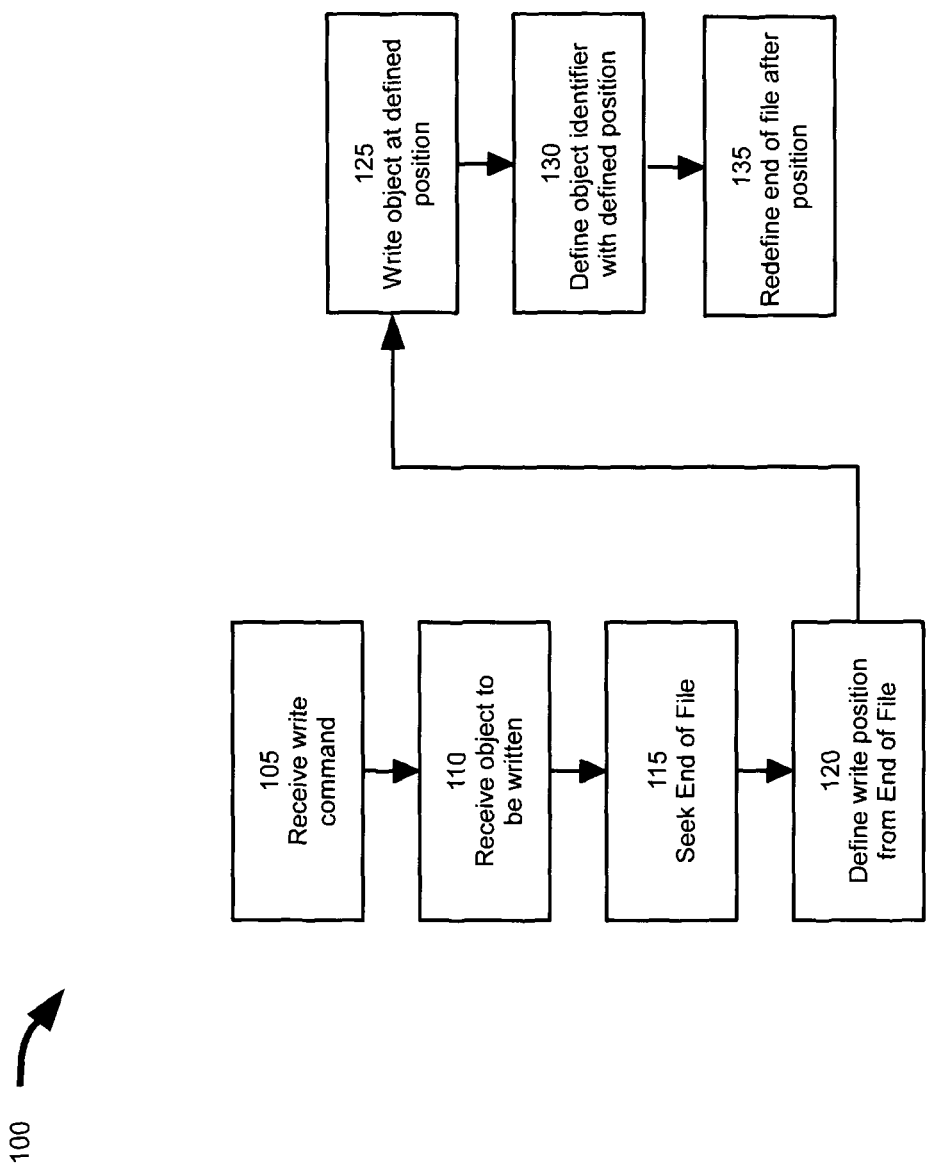
FIG. 2 shows a flow chart depicting a method for storage.
Figure 3:
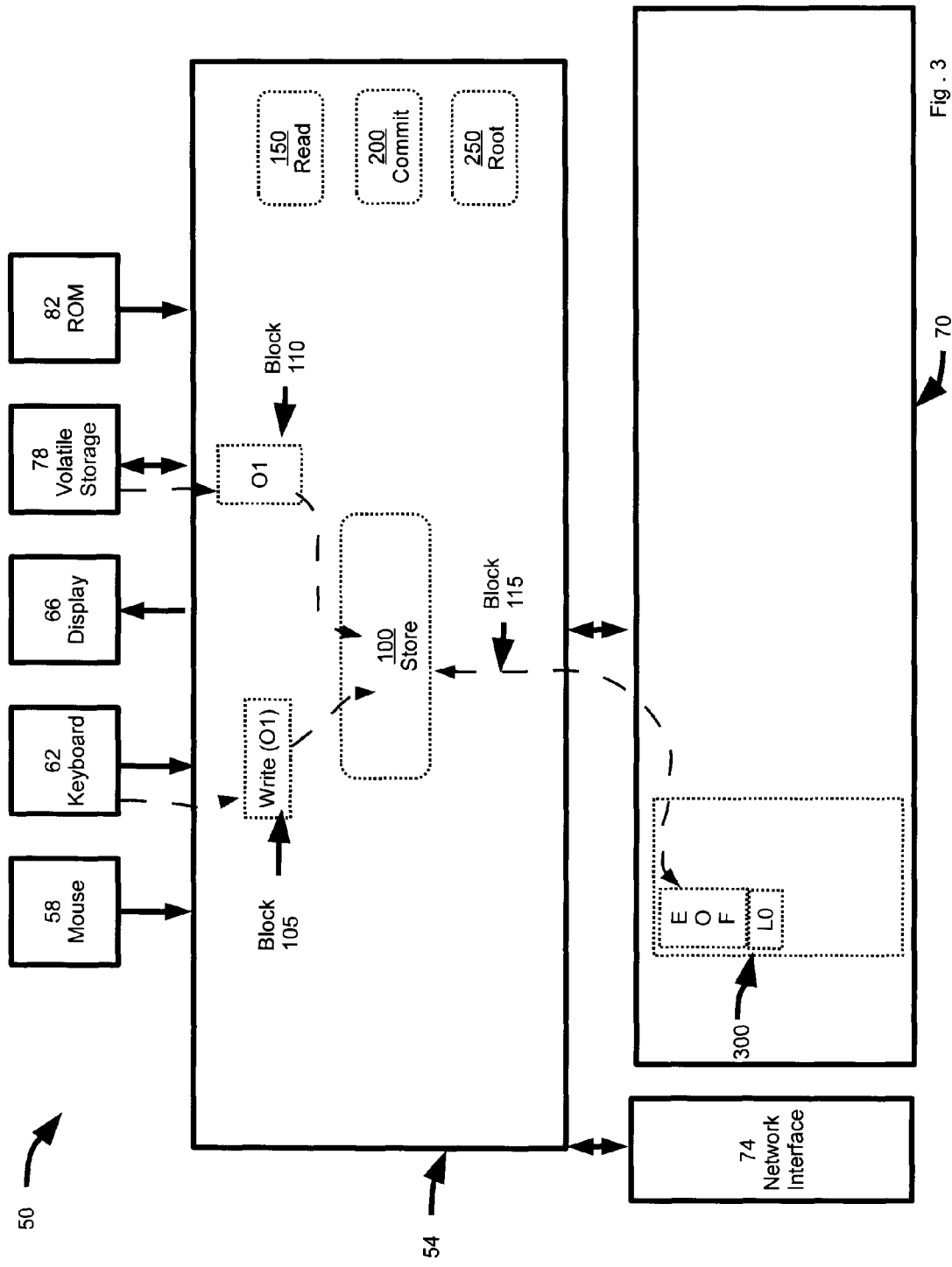
FIG. 3 shows the system of FIG. 1 during exemplary performance of certain blocks in FIG. 2.
Figure 4:
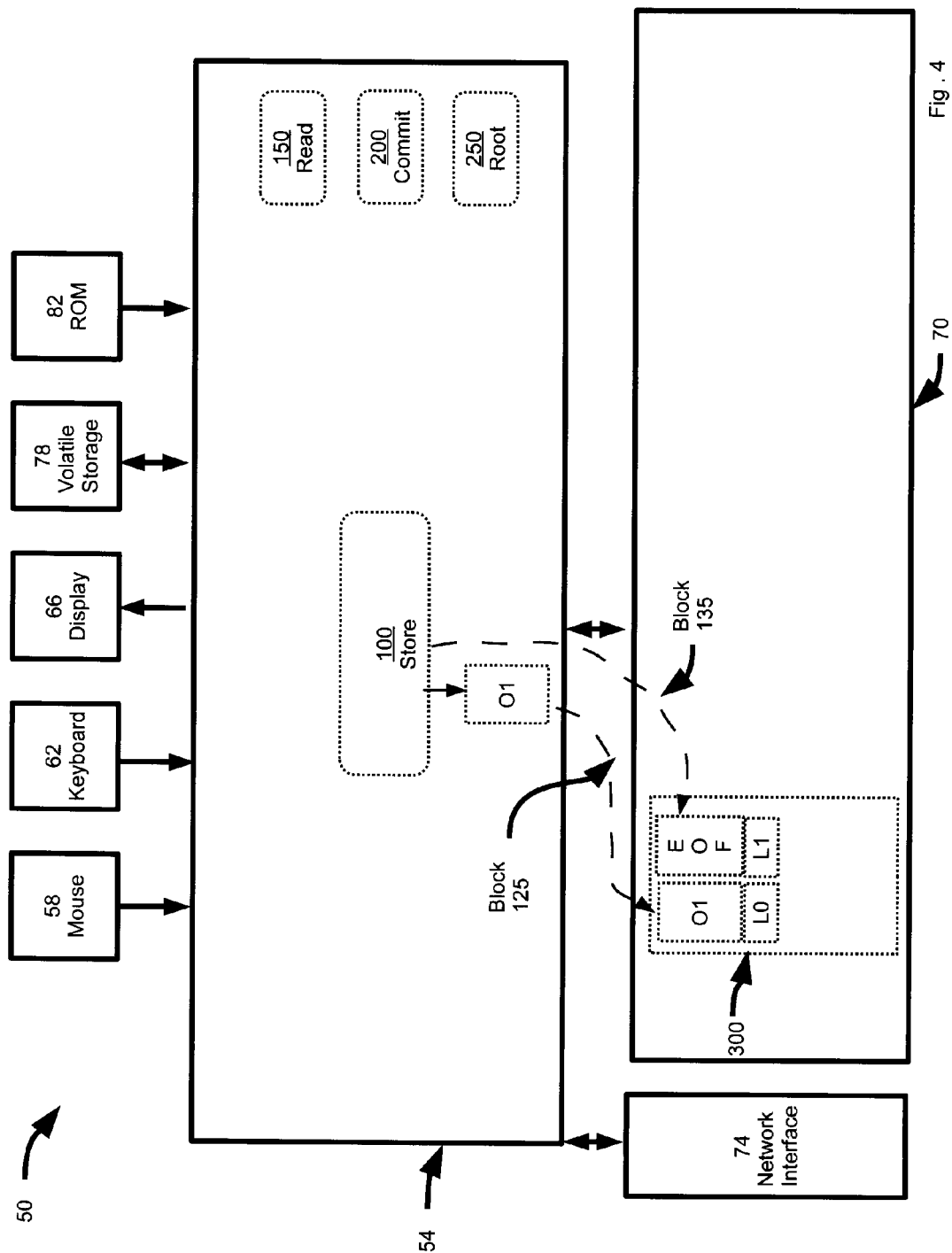
FIG. 4 shows the system of FIG. 1 during exemplary performance of certain blocks in FIG. 2.

Referring now to FIG. 2, a flow-chart depicting an exemplary method of implementing store 100 is indicated generally 100. Exemplary performance of store 100 is represented in FIGS. 3 and 4 as an object O1 is shown as being taken from volatile storage 78 and stored within file 300 using store 100. At block 105, a write command is received. Such a write command can be received by store 100 using any known means, including a direct command inputted via keyboard 62, or via another process (not shown) executing on processor 54. At block 110, the object to be written is received. The object received at block 110 is associated with the write command received at step 105. At block 115, the end of file is sought. As part of block 115, store 100 accesses file 300 and seeks end-of-file marker EOF in file 300 in order to determine the Location of end-of-file marker EOF. Taking the result from block 115, at block 120 store 110 defines the write Location in file 300 for object O1, which in the present example is Location L0. At block 125, the object is written at the Location defined at block 120. Block 125 is represented in FIG. 4 as object O1 is shown now located at Location L0 within file 300. At block 130 an object identifier is defined that is associated with object O1 as it is now stored in Location L0. The object identifier can be any index or pointer that now reflects Location L0. At block 135, the end-of-file marker EOF is redefined to the Location after the Location in which the object has been written at step 125. In the present example, as shown in FIG. 4, end-of-file marker EOF is now shown as stored in Location L1.

Figure 5:
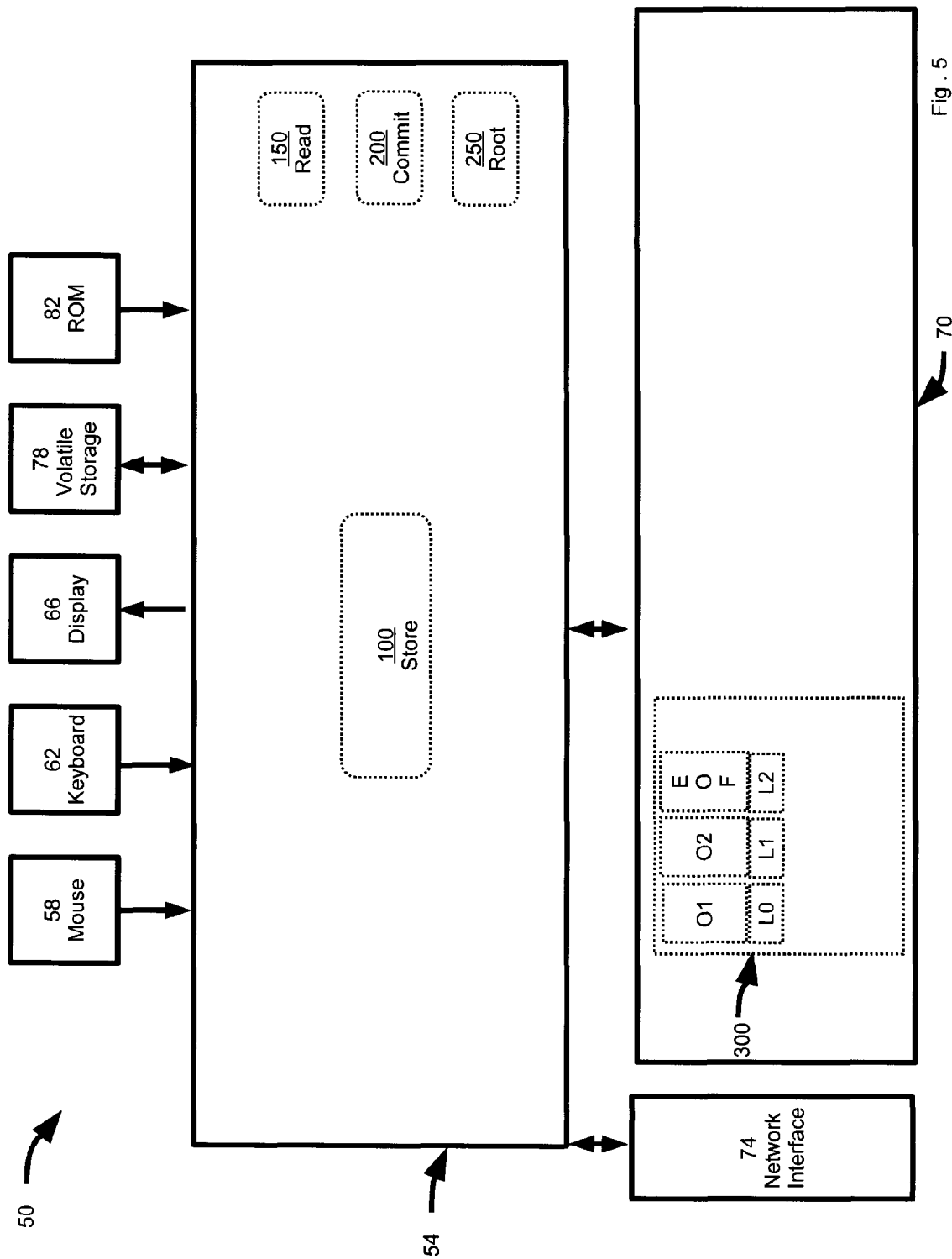
FIG. 5 shows the system of FIG. 1 during exemplary performance of certain blocks in FIG. 2.

It should now be understood the repeated performances of store 100 will continue to append objects to file 300. For example, assume that store 100 is executed again for a second object O2 immediately after the preceding exemplary performance of store 100 for object O1. As a result of such performance, file 300 would appear as represented in FIG. 5, with object O1 in Location L0, object O2 in Location L1, and end-of-file marker EOF at Location L2. To continue with this example, the object identifier for O2 is Location L1. According to this example, Table I below shows another representation of the contents of file 300 that corresponds to FIG. 5.

TABLE I

Exemplary contents of File 300 according to FIG. 5

| Object/Contents | Location | Active |
|---|---|---|
| Object O1 | L0 | Yes |
| Object O2 | L1 | Yes |
| EOF Marker EOF | L2 | Yes |

Thus, Table I corresponds to the file 300 as shown in FIG. 5, with the one exception that Table I additionally includes a column titled "Active" which is not actually reflective of file contents but instead represents whether the particular object in the respective Location of Table I is currently in use or not. The purpose of the "Active" column will become clearer from further reading below.

The teachings herein are applicable to the storage of many types of file structures. One exemplary type of file structure is a tree structure. Building on the example of file 300 in FIG. 5 and Table II, FIG. 6 shows object O2 and object O1 represented as part of a very basic tree structure T-1 with a root and single child node, wherein object O2 is the root and object O1 is the child node. Accordingly, pointers are also needed identify the relationships in the tree structure. Thus, a root marker RM is additionally needed with a pointer to the Location of object O2. Table II builds upon Table I and includes such pointers.

TABLE II

Exemplary contents of File 300 including pointers and root marker

| Object/Contents | Location | Pointers | Active |
|---|---|---|---|
| Object O1 | L0 | P0 = None | Yes |
| Object O2 | L1 | P1 = Location L0 | Yes |
| Root Marker RM | L2 | P2 = Location L1 | Yes |
| EOF Marker EOF | L3 | P3 = None | Yes |

Figure 7:
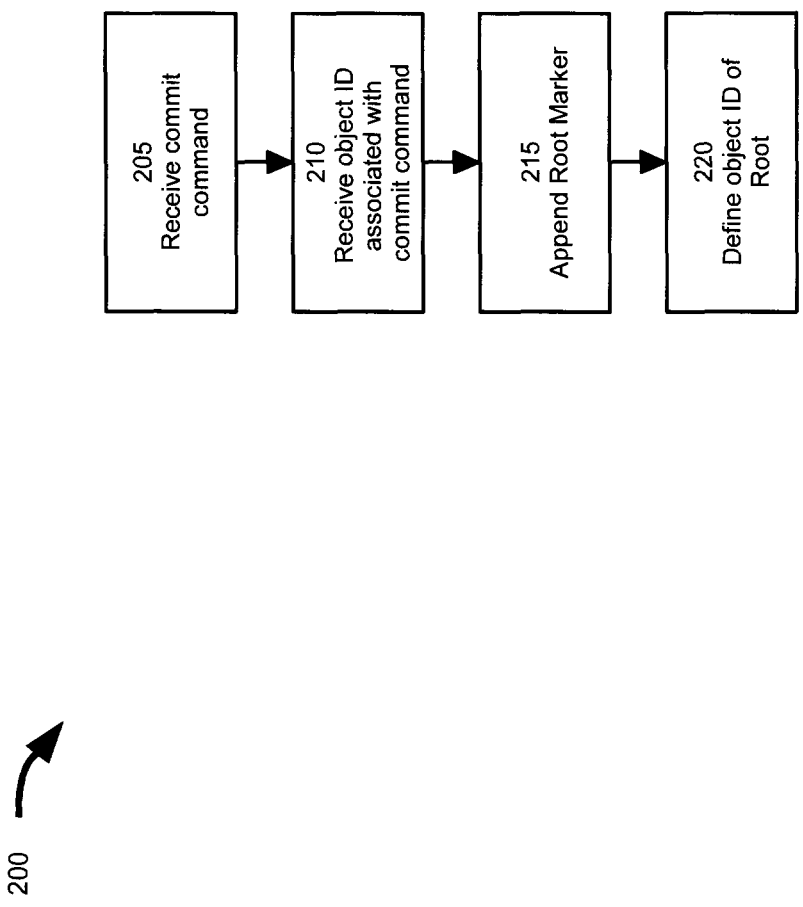
FIG. 7 shows a flow chart depicting a method for committing storage.
Figure 8:
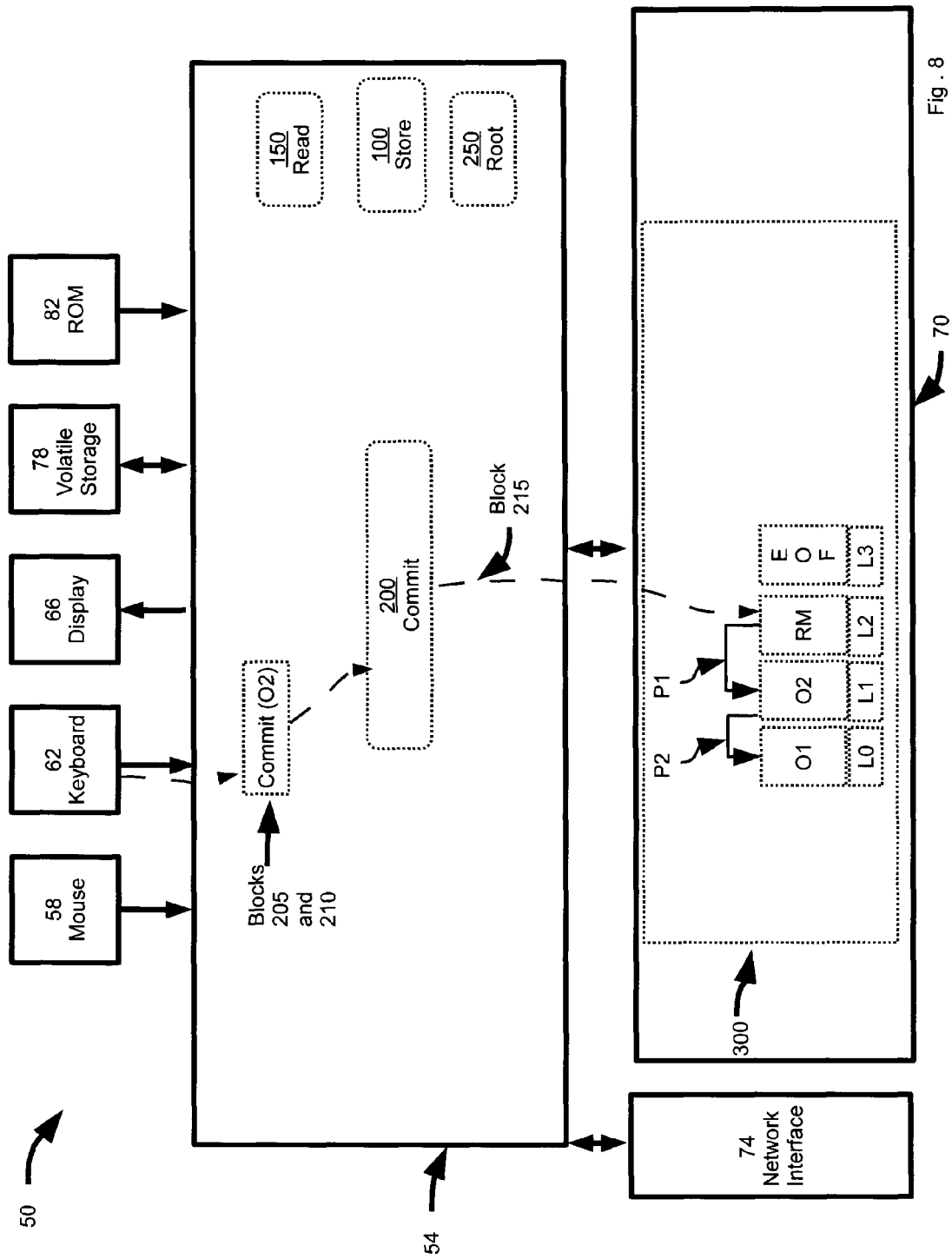
FIG. 8 shows the system of FIG. 1 during exemplary performance of certain blocks in FIG. 7.

Referring now to FIG. 7, a flow-chart depicting an exemplary method of implementing commit 200 (previously mentioned in relation to FIG. 1) is indicated generally 200. Commit 200 can be used to add root marker RM. FIG. 8 shows system 50 wherein file 300 reflects the contents of Table II including the invocation of commit 200 in order to include root marker RM and appropriate pointers in file 300. At block 205, the commit command is received. Such a commit command can be received by commit 100 using any known means, including a direct command inputted via keyboard 62, or via another process (not shown) executing on processor 54. At block 110, the object ID to be written is received. The object ID received at block 110 is associated with the commit command received at step 105, and typically embedded therein. In the present example, the commit command includes the parameter O2 to identify object O2. At block 215, the root marker is appended. As part of block 215, commit 200 accesses file 300 and seeks end-of-file marker EOF in file 300 in order to determine the location of end-of-file marker EOF, and then defines the write location for the root marker RM and moves end-of-file marker EOF to location L3. Additionally, root marker RM is stored to include pointer P1 which points to object O2 in location L1, and object O2 is stored to include pointer P2 which points to object O1 in location L0. Those skilled in the art will now recognize that file 300 now stores object O1 and object O2 in a manner that corresponds to tree structure T-1 shown in FIG. 6.

Figure 10:
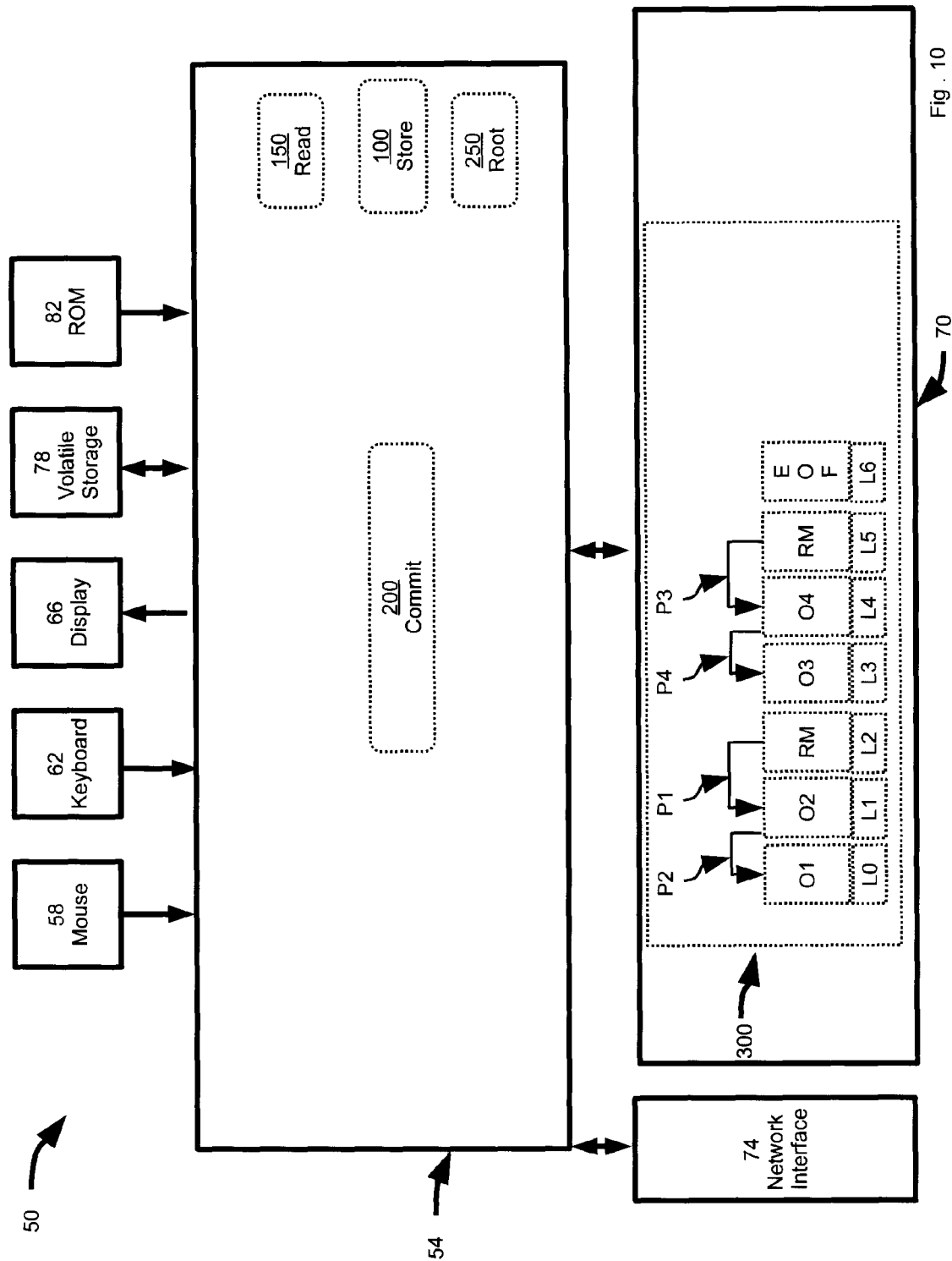
FIG. 10 shows the system of FIG. 1 following exemplary performance FIG. 7 in relation to the data structure of FIG. 9.

It should now be understood that store 100 and commit 200 can be performed any number of times and file 300 will grow in size, particularly in light of the fact that no delete command is utilized. For example, assume that tree structure T-1 is to be replaced by tree structure T-2 shown in FIG. 9. Tree structure T-2 includes a root containing object O4 and a child node containing object O3. When store 100 is performed twice to store object O3 and object O4, and when commit 200 is performed once to identify object O4 as the root, file 300 will have the appearance as shown in FIG. 10. Table III shows a corresponding representation of file 300 in FIG. 10.

TABLE III

Exemplary contents of File 300 including pointers and root marker corresponding to FIG. 10

| Object/Contents | Location | Pointers | Active |
|---|---|---|---|
| Object O1 | L0 | P0 = None | No |
| Object O2 | L1 | P1 = Location L0 | No |
| Root Marker RM | L2 | P2 = Location L1 | No |
| Object O3 | L3 | P3 = None | Yes |
| Object O4 | L4 | P4 = Location L3 | Yes |
| Root Marker RM | L5 | P5 = Location L4 | Yes |
| EOF Marker EOF | L6 | P3 = None | Yes |

Of note is that file 300 continues to grow, but object O1, object O2 and the root marker RM in location L2 are no longer active. However, it is to be reemphasized that the "Active" status column is not expressly maintained by file 300, but is the effective result of utilizing store and commit as previously described. Indeed, the "active" status need not even be relevant depending on the intended use of file 300, since tree structure T-1 in the form of object O1, object O2 and the root marker RM in location L2 is still available on an archive basis.

Figure 11:
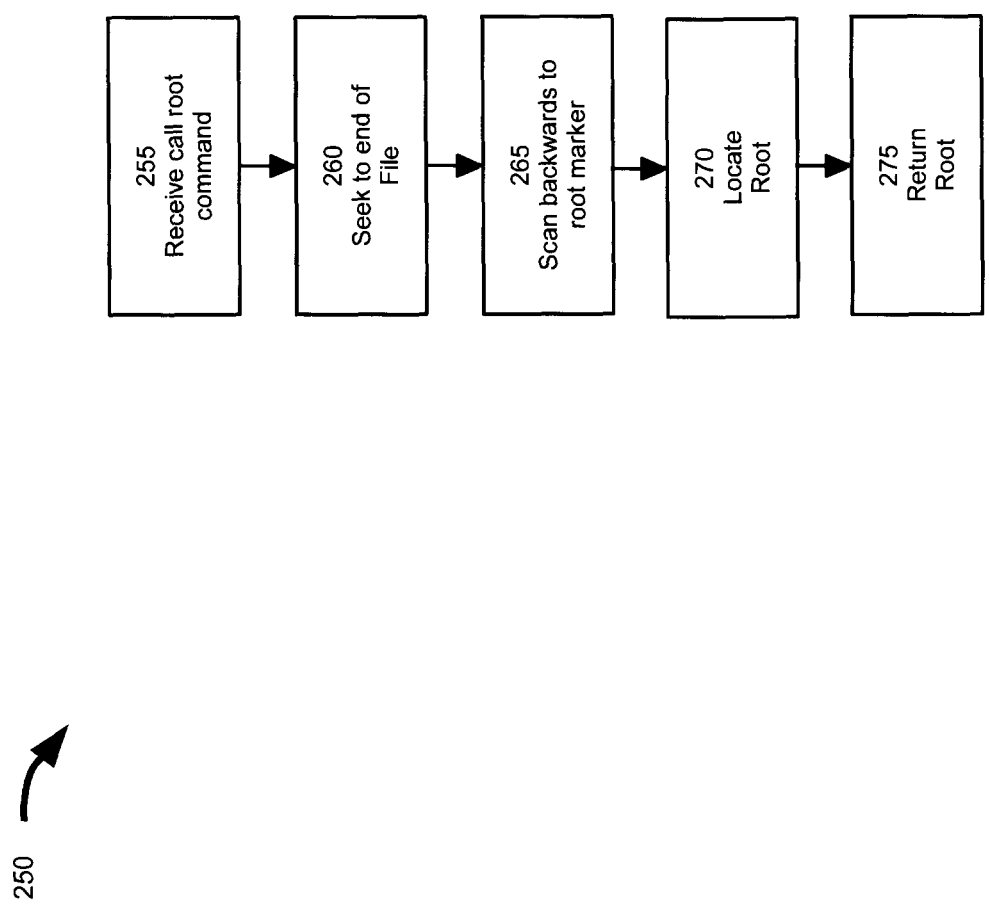
FIG. 11 shows a flow chart depicting a method for calling the root.
Figure 12:
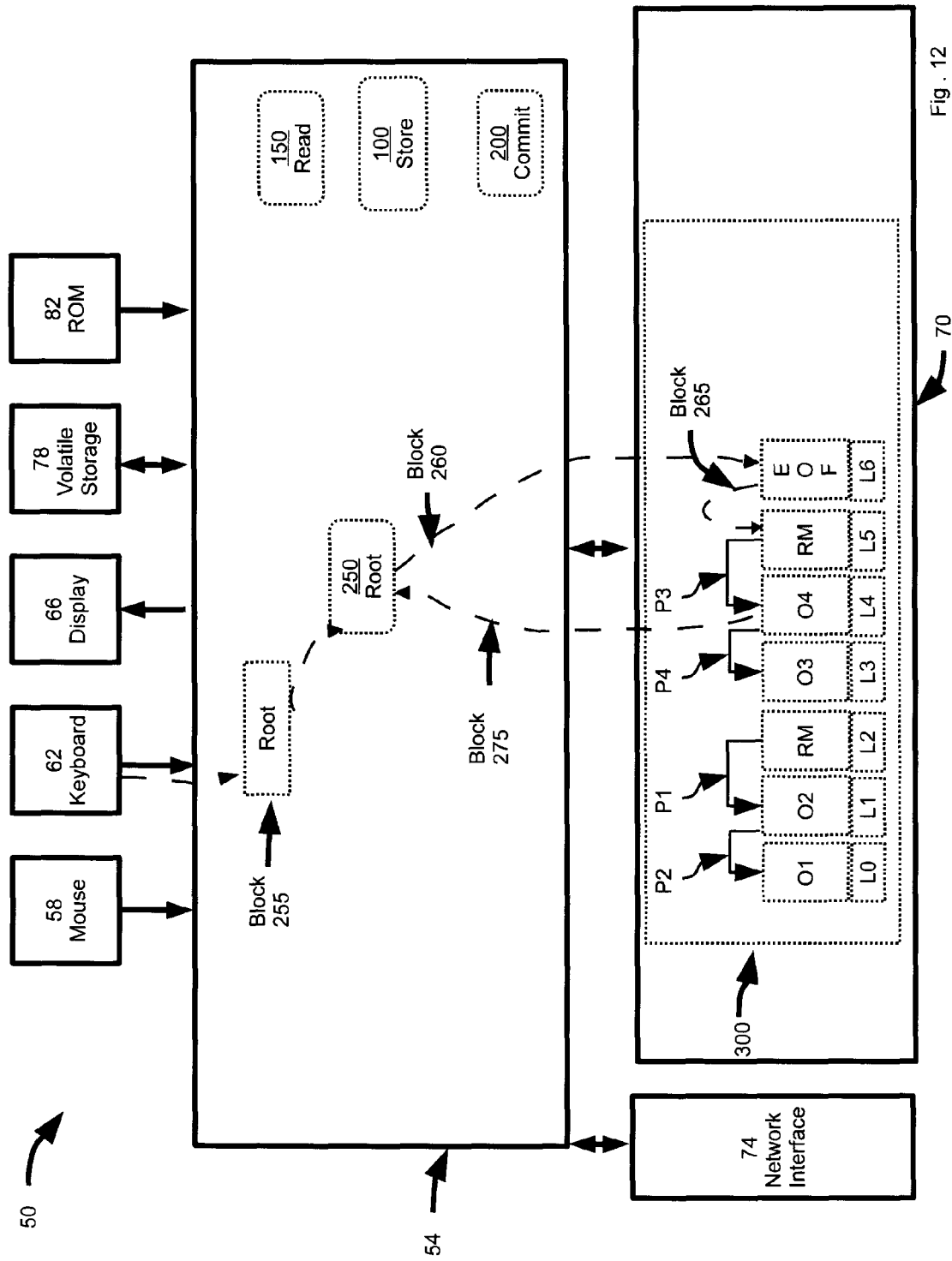
FIG. 12 shows the system of FIG. 1 during exemplary performance of certain blocks in FIG. 11.

Referring now to FIG. 11, a flow-chart depicting an exemplary method of implementing root 250 (previously mentioned in relation to FIG. 1) is indicated generally 250. Root 250 can be used to locate the root of a given tree structure stored within file 300. FIG. 12 shows system 50 representing exemplary performance of the method in FIG. 11. At block 205, the root command is received. Such a root command can be received by root 250 using any known means, including a direct command inputted via keyboard 62, or via another process (not shown) executing on processor 54. At block 260, a seek to end of file is performed. At block 265 a backwards scan through file 300 is performed until the root marker RM is found. In the case of Table III, the backwards scan reaches the root marker RM in location L4, and thus it can be seen where there is more than one root marker RM in a given file, only the root marker RM nearest the end of file marker EOF will be found at block 265. Accordingly, the remaining root markers RM in a given file are effectively rendered inactive, without the need to expressly identify them as such. At block 270, the root is located. Block 270 is performed by examining the pointer associated with the root marker RM found at block 265. In this example, the pointer references location L4, where object O4 is stored. At block 275, the root found at block 270 is returned—and thus in this case object O4 is returned to root 250 for further processing.

Figure 13:
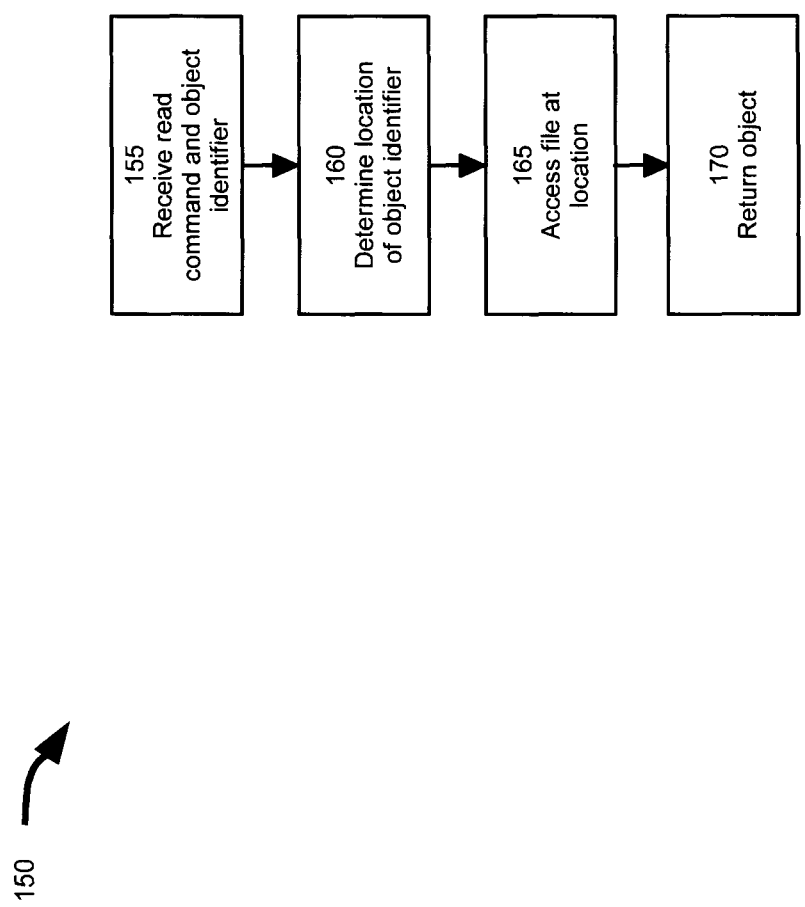
FIG. 13 shows a flow chart depicting a method for performing a read.
Figure 14:
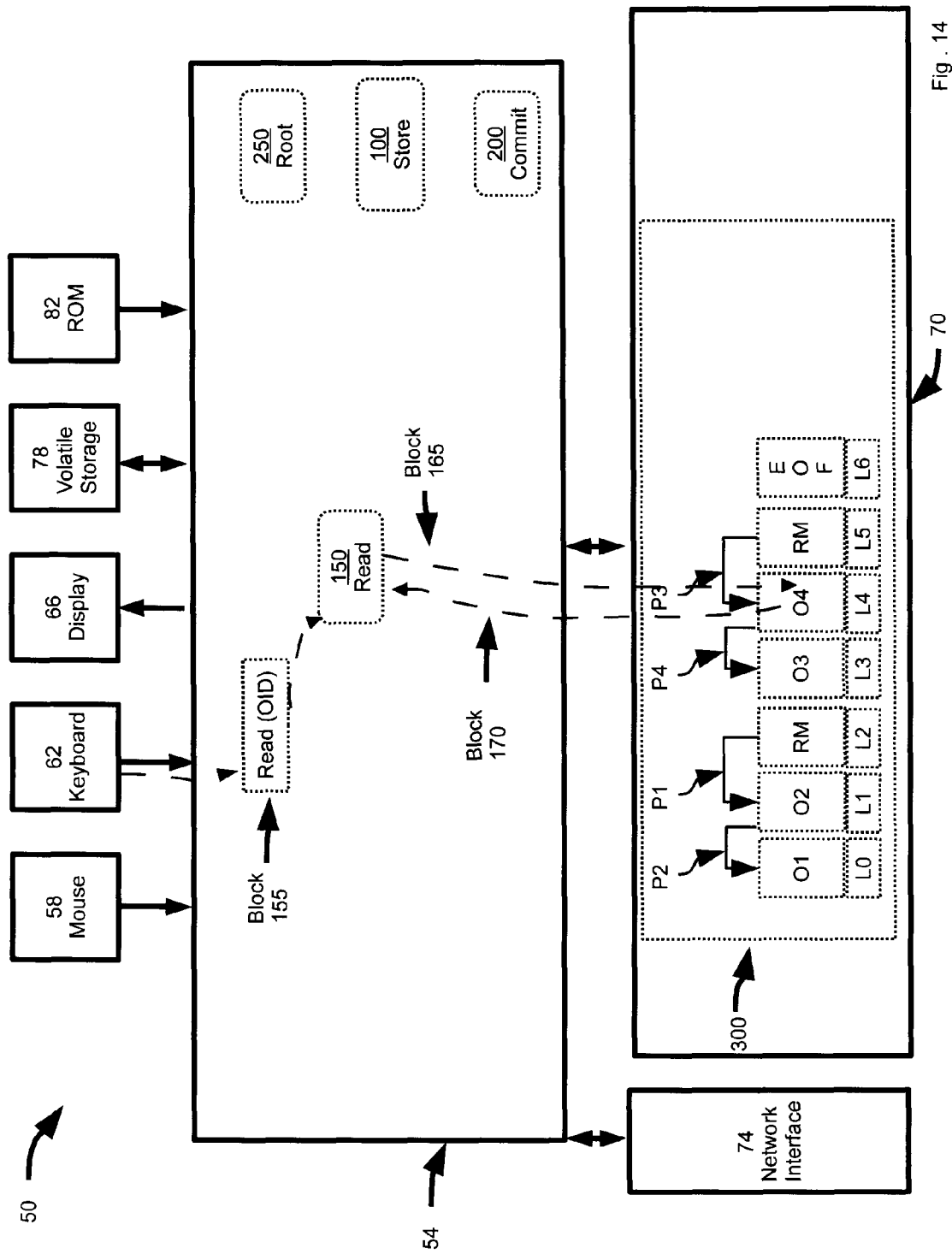
FIG. 14 shows the system of FIG. 1 during exemplary performance of certain blocks in FIG. 13.

Referring now to FIG. 13, a flow-chart depicting an exemplary method of implementing read 150 (previously mentioned in relation to FIG. 1) is indicated generally 150. Read 150 can be used to read the contents of a given object within file 300. FIG. 13 shows system 50 representing exemplary performance of the method in FIG. 14. At block 155, the read command is received. Such a root command can be received by read 150 using any known means, including a direct command inputted via keyboard 62, or via another process (not shown) executing on processor 54. Additionally at block 155, an object identifier OID associated with the read command is received. In a basic form, the object identifier can be one of the locations L0-L5 within file 300 in FIG. 14. (In more complex scenarios, the object identifier itself can be a variable (e.g. "X") that itself points to the location L0-L5, so that if the object is changed by writing it again at a subsequent location within file 300 using store 200, then the location associated with the variable is updated at the time it is written.) In a present example object identifier OID is the location L4. At block 165, the location of file 300 associated with the location associated with object identifier OID is accessed—which in this example is location L4. At block 170, the contents of the location accessed at block 165 are returned—which in this example is object O4 as stored in location L4.

Figure 15:
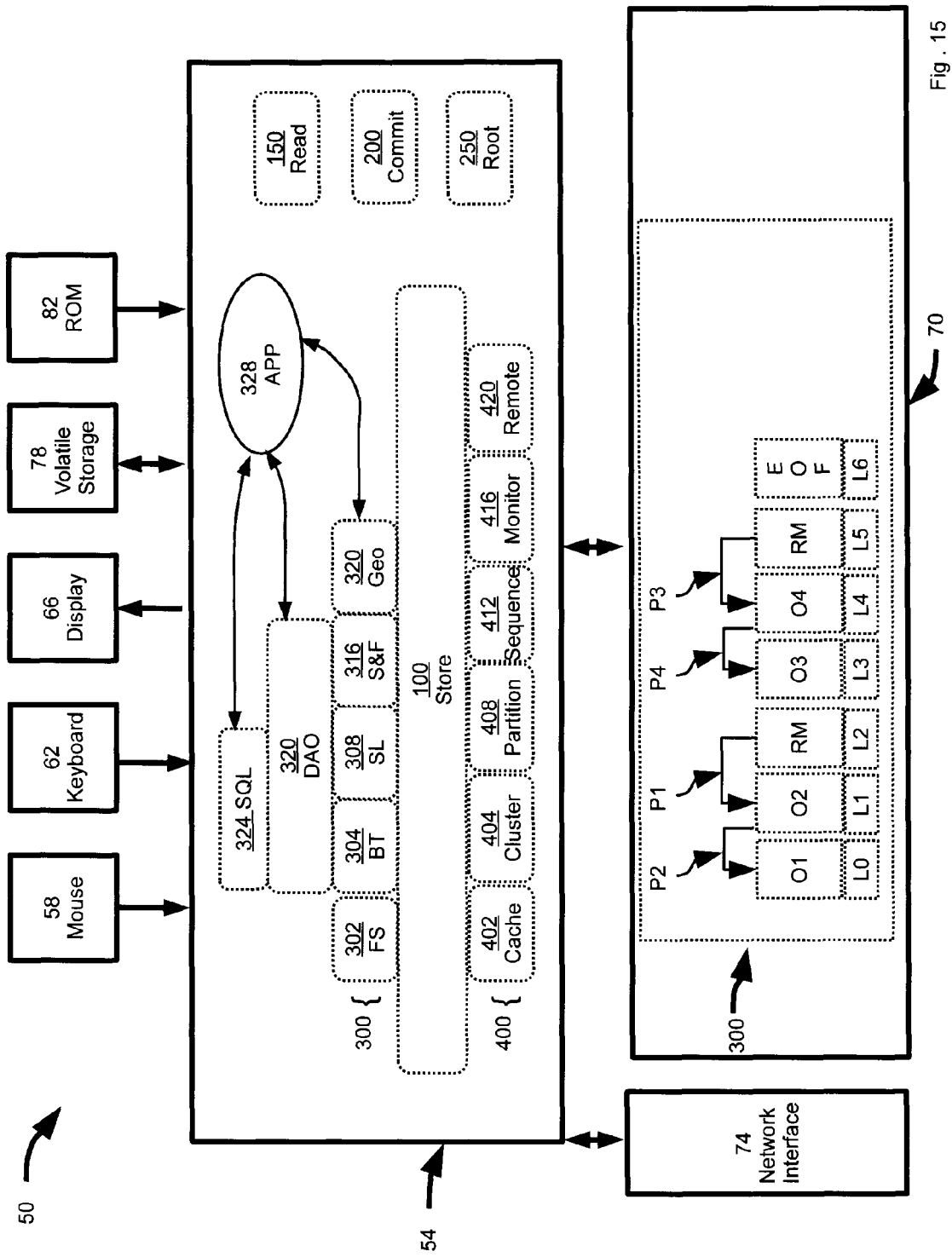
FIG. 15 shows the system of FIG. 1 with certain additional application programming interfaces and plug-ins associated therewith.

Referring now to FIG. 15, another implementation of system 50 is shown. In FIG. 15, system 50 additionally includes a plurality of higher-level application program interfaces (API) 300. APIs 300, in a present embodiment, include a file system interface 302, a B-tree (B-tree) interface 304, a skip list interface 308, a store and forward interface 316, and a geographic interface 320. APIs 300 in turn can be accessed by a data access object (DAO) 320, a structured query language (SQL) 324. All of the foregoing can be accessed by an application 328. It should now be apparent that store 100 is in and of itself an application program interface which can be utilized, directly or indirectly, by APIs 300, DAO 320, SQL 324 or application 328. Such utilization of store 100 can be substantially transparent, such that the exact means by which store 100 actually interacts with file 300 is completely unknown and substantially irrelevant to the operation of APIs 300, DAO 320, SQL 324 or application 328. It should also be understood that system 50 as shown in FIG. 15 can be varied to include none of, or one or more of, APIs 300, DAO 320, SQL 324 or application 328.

In FIG. 15, system 50 additionally includes a plurality of lower-level plug-ins 400. Plug-ins 400, in a present embodiment, include caching plug-in 402, a clustering plug-in 404, a partitioning plug-in 408, a sequencing plug-in 412, a monitoring plug-in 416 and a remoting plug-in 420. It should also be understood that system 50 as shown in FIG. 15 can be varied to include none of, or one or more of plug-ins 400. Each plug-in 400 can be used to influence and/or enhance how store 100 interacts with file 300. It should now also be apparent that regardless of which plug-ins 400 are used, such plug-ins are also transparent to APIs 300, DAO 320, SQL 324 or application 328.

File system interface 302 can be based on any suitable file manager, such as the well-known file manager interface found within a Windows™ operating system from Microsoft Corporation, Redmond, Wash., USA.

B-tree interface 304, discussed further below, can be an interface that automatically manages the storage (including deletion and appending) of objects maintained in a B-tree structure on behalf of a higher level application. (While the present example is a B-tree, in other embodiments similar tree structures are contemplated such as B+-Tree, B*-Tree, binary tree, trie, and the like.)

Skip list interface 308, can be an interface that automatically manages the storage (including deletion and appending) of objects maintained in a linked list structure on behalf of a higher level application.

Likewise, store and forward interface 316 is also an interface that automatically manages storage of objects maintained in the structures bearing similar name to the respective interface. Store-and-forward interface 316 can be used to implement clustering, since with clustering changes to the local store are communicated to remote stores so that remote stores can make the corresponding changes local to their copies as well. In this example, remoting plug-in 460 would be used in conjunction with store and forward interface 316. In the event the remote server being accessed by remoting plug-in 460 is temporarily inaccessible, then data would be stored somewhere until such time as the missing resource becomes accessible again, all of which would be managed by store-and-forward interface 316. All updates for the remote node would be stored in a store-and-forward structure until they could ultimately be delivered.

Geographic interface 320 manages the storage of objects that represent geographic locations, as might be implemented using a quad-tree. It should now be apparent that interfaces 300 in general manage the storage structure as that structure is utilized by higher level applications, and such interfaces 300 access store 100 accordingly. Interfaces 300 can issue interact with store 100 via block 105 and block 110 as per the method shown in FIG. 2. Though not shown in FIG. 15, interfaces 300 can likewise interact with read 150, commit 200 and root 250.

DAO 320, SQL 324 and application 328 represent higher level applications or interfaces which directly or indirectly utilize store 100.

Caching plug-in 402 can work transparently with and on behalf of store 100 such that storage of certain objects according to store 100 are temporarily stored in volatile storage 78 (or a separate volatile storage device not shown) according to a given criteria. When the criteria is satisfied those objects are actually flushed to persistent storage device 70 in the manner described above.

Clustering plug-in 404 can work transparently with and on behalf of store 100 such that file 300 is spread across a plurality of persistent storage devices (not shown in FIG. 15).

Partitioning plug-in 408 is similar in concept to clustering plug-in 404 and can also work transparently with and on behalf of store 100 such that portions of file 300 are stored across a multiple number of persistent storage devices 70. By way of further explanation, clustering plug-in stores 404 all data to all persistent storage devices, whereas partitioning plug-in 408 typically only stores a subset of data across each persistent storage device. Also, with clustering, updates can originate from multiple locations whereas with partitioning updates typically occur from one location unless there is further partitioning.

Sequencing plug-in 412, can be implemented as a variant of clustering plug-in 404, utilizes a plurality of persistent storage devices (not shown) in sequence, such that when one persistent storage device is full the file is continued on the next persistent storage device. Sequencing plug-in 412, can also be implemented so that data inserted during the same time period (e.g. during one day or week) are all stored in the same file. This implementation can make time-based retention policies simple (ie. deleting data after 90 days for example) as one just drop whole files of when the data in them expires.

Monitoring plug-in 416 can be used to assess the utilization of persistent storage device 70 (or multiples thereof) so that operations from store 100 can be moderated to accommodate any restrictions associated with a given persistent storage devices.

Remoting plug-in 420 can be used where a remotely connected persistent storage device (not shown) is connected to network interface 74, in order to permit store 100 to utilize such remotely connected persistent storage devices.

Figure 16:
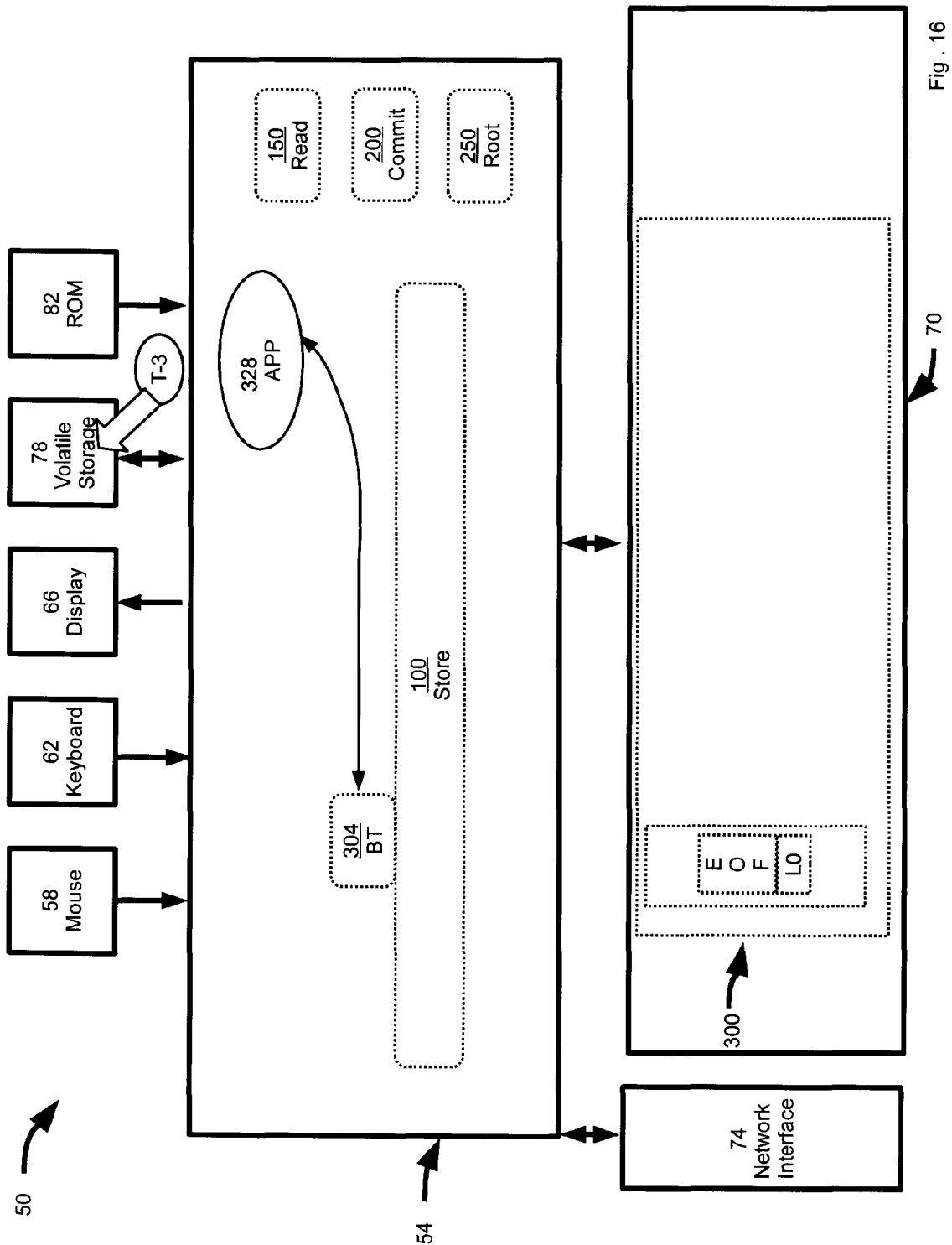
FIG. 16 shows a variation on the system of FIG. 15 with only the B-tree application programming interface.
Figure 17:
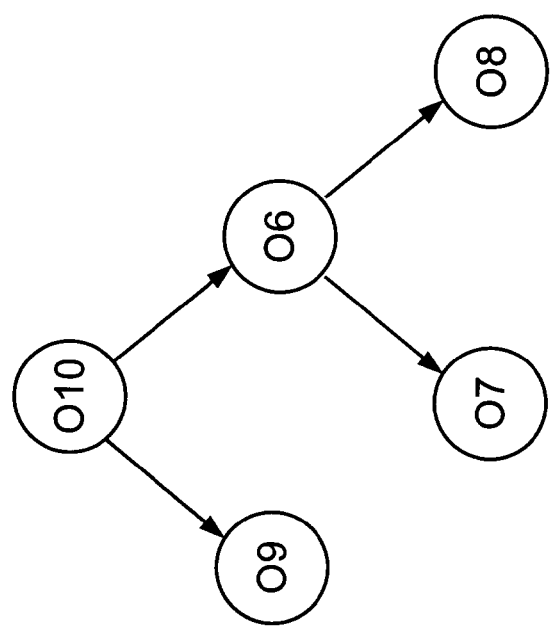
FIG. 17 shows an exemplary B-tree that can be stored using the system of FIG. 16.
Figure 18:
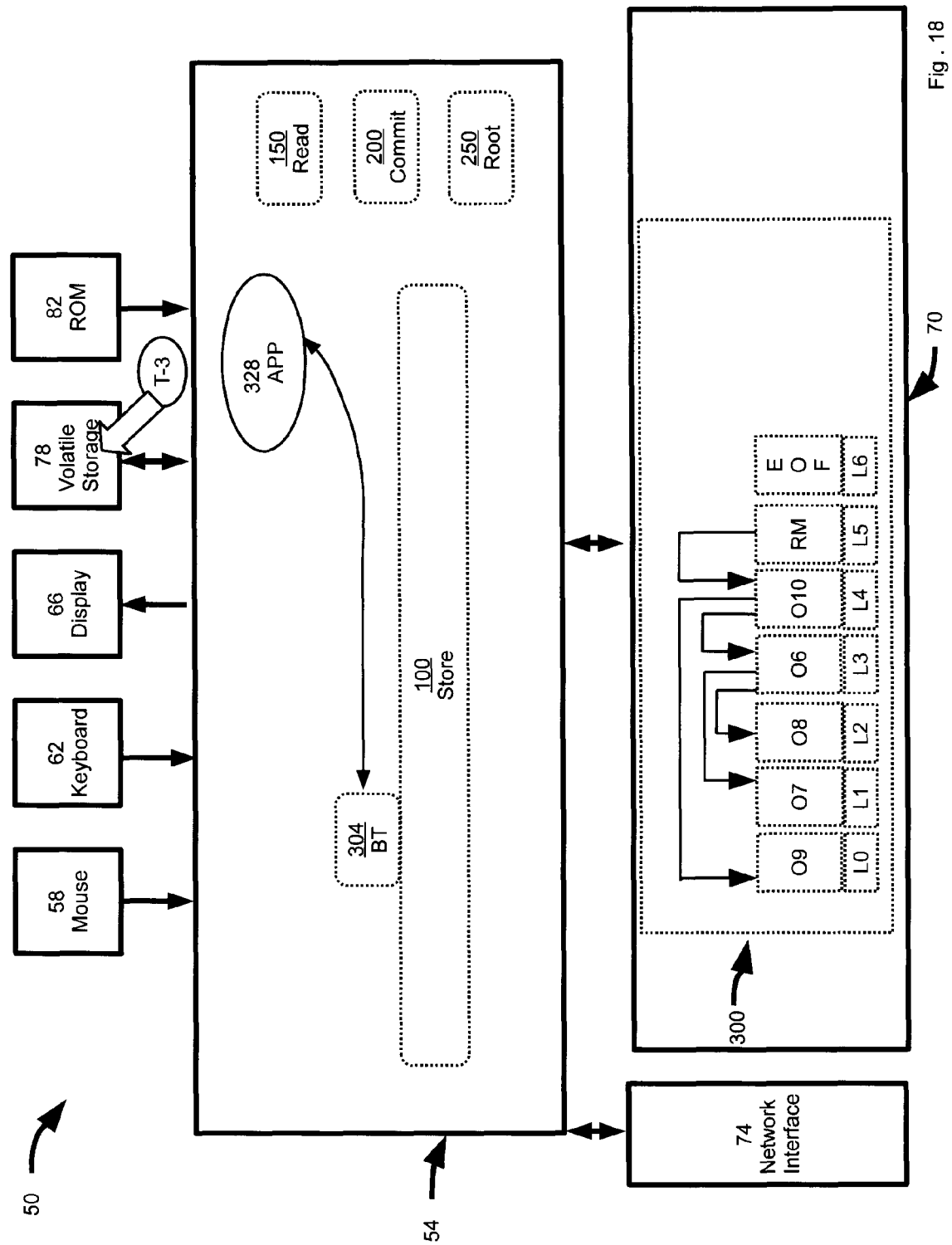
FIG. 18 shows the system of FIG. 16 after storing the tree of FIG. 17.

It is to be reemphasized that the components relative to interfaces 300 and plug-ins 400 as introduced in FIG. 15 can be "mixed and matched" according to any desired combination. FIG. 16 shows one such simplified example, wherein B-tree interface 304 is shown alone in conjunction with store 100 as being accessed by application 328. FIG. 17 shows a B-tree T-3 stored in volatile storage 78 which is to be written to file 300. FIG. 17 shows an example of B-tree T-3 in greater detail that is be stored by application 328 using B-tree interface 304 and store 100. When completely stored, file 300 will appear as shown in FIG. 18. B-tree interface 304 issues the instructions to store 100 (and to commit 200) as appropriate so that file 300 has the structure of storage locations, pointers, root marker and contents that are reflective of B-tree T-3, as shown in FIG. 18, all in a manner transparent to application 328. B-tree T-3 can now likewise be accessed by application 150 via tree interface 304 using read 150 and root 250.

Figure 19:
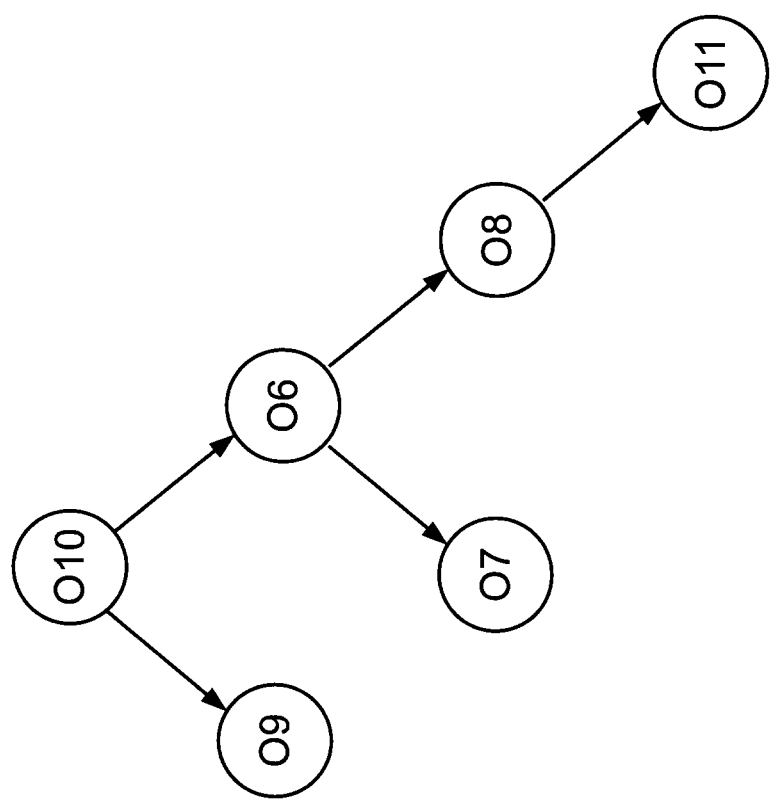
FIG. 19 shows an exemplary addition to the B-tree of FIG. 17.
Figure 20:
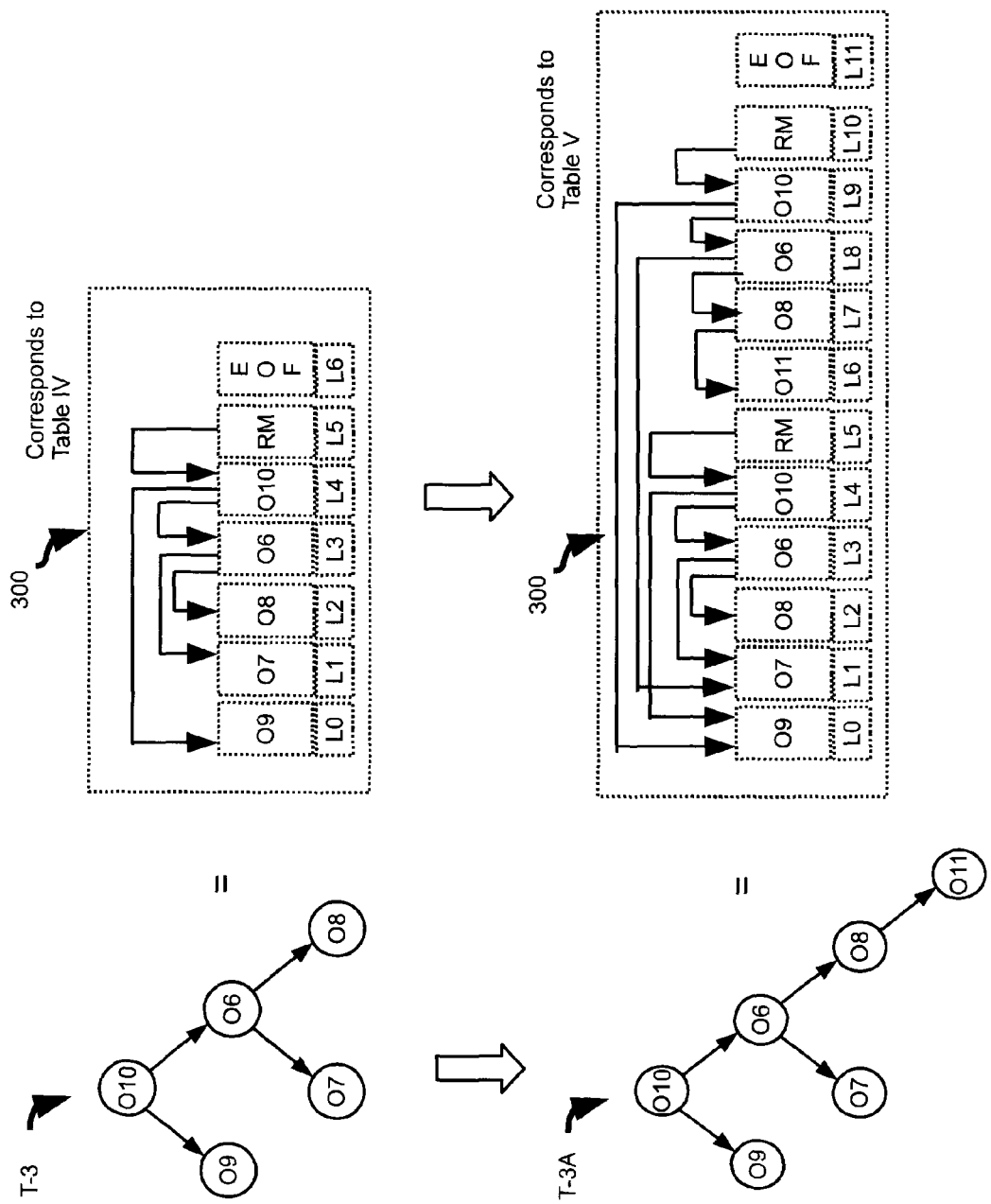
FIG. 20 shows the B-trees of FIGS. 17 and 19 and exemplary changes to the file during the storage of the B-tree of FIG. 19.

File 300 from this point will simply grow in size. For example, FIG. 19 shows B-tree T3-A which adds object O11 as a child depending from object O8. The top half of FIG. 20 shows B-tree T-3 beside its corresponding version of file 300, reproducing B-tree T-3 from FIG. 17 and file 300 from FIG. 18. Assuming that object O11 is simply added to B-tree T-3 to produce B-tree T-3A by application 328, then B-tree interface 304 will work with store 100 and commit 200 such that file 300 is grown so that it appears as shown in the lower half of FIG. 20. To further assist in the foregoing, Table IV shows the contents of file 300 as shown in FIG. 18 and in the top half of FIG. 20, corresponding to the initial storage of B-tree T-3

TABLE IV

Exemplary contents of File 300 including pointers and root marker corresponding to B-tree T-3

| Object/Contents | Location | Pointers | Active |
|---|---|---|---|
| Object O9 | L0 | P0 = None | Yes |
| Object O7 | L1 | P1 = None | Yes |
| Object O8 | L2 | P2 = None | Yes |
| Object O6 | L3 | P3 = Location L1 | Yes |
| | | P4 = Location L2 | |
| Object O10 | L4 | P5 = Location L3 | Yes |
| | | P6 = Location L0 | |
| Root Marker RM | L5 | P7 = Location L4 | Yes |
| EOF Marker EOF | L6 | P8 = None | Yes |

To further assist in the foregoing, Table V shows the contents of file 300 after file 300 is updated from the state shown in Table IV, (and as also shown the bottom half of FIG. 20), corresponding to the storage of B-tree T-3A in File 300 by B-tree interface 304 and store 100 after application 328 appended object O11 to object O8 and instructed that B-tree T-3A be persistently stored.

TABLE V

Exemplary contents of File 300 including pointers and root marker corresponding to B-tree T-3

| Object/Contents | Location | Pointers | Active |
|---|---|---|---|
| Object O9 | L0 | P0 = None | Yes |
| Object O7 | L1 | P1 = None | Yes |
| Object O8 | L2 | P2 = None | No |
| Object O6 | L3 | P3 = Location L1 | No |
| | | P4 = Location L2 | |
| Object O10 | L4 | P5 = Location L3 | No |
| | | P6 = Location L0 | |
| Root Marker RM | L5 | P7 = Location L4 | No |
| Object O11 | L6 | P8 = None | Yes |
| Object O8 | L7 | P9 = Location L6 | Yes |
| Object O6 | L8 | P10 = Location L1 | Yes |
| | | P11 = Location L7 | |
| Object O10 | L9 | P12 = Location L0 | Yes |
| | | P13 = Location L8 | |
| Root Marker RM | L10 | P14 = Location L9 | Yes |
| EOF Marker EOF | L11 | P8 = None | Yes |

Using the foregoing, it will now be understood that deletion of nodes can be effected in a similar manner, whereby file 300 just continues to grow and various locations cease to be active and new locations in file 300 are written to, even with duplicates of data already present within file 300 in the event that new pointers are required.

Figure 21:
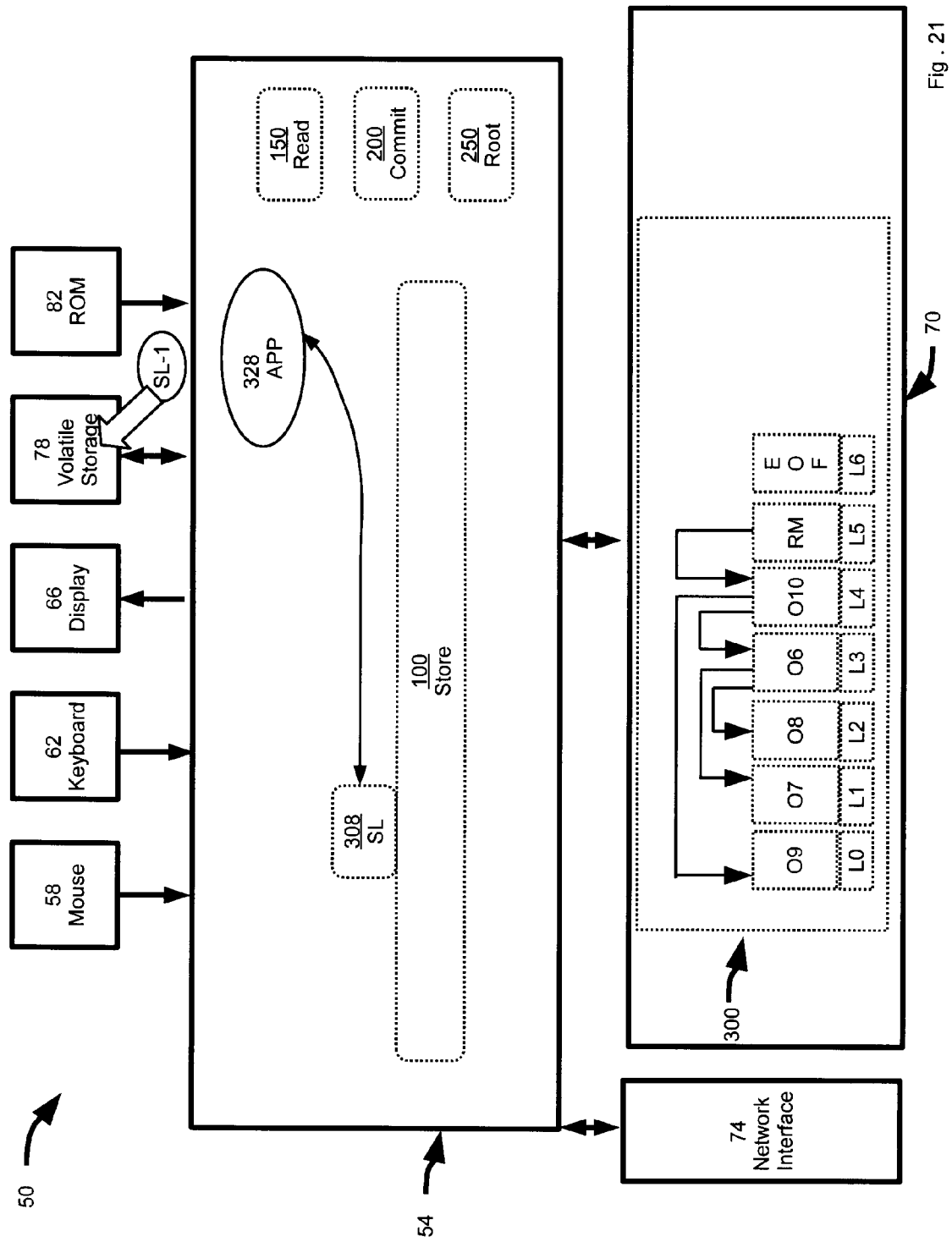
FIG. 21 shows a variation on the system of FIG. 15 with only the skip list application programming interfaces.
Figure 22:
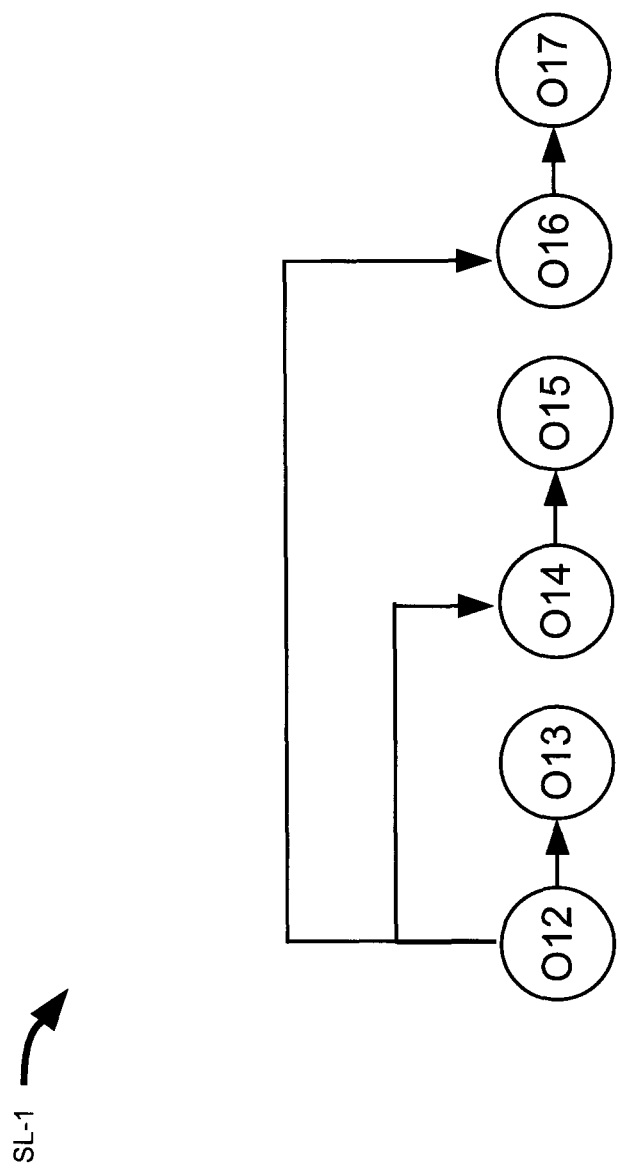
FIG. 22 shows an exemplary skip list that can be stored using the system of FIG. 21.
Figure 23:
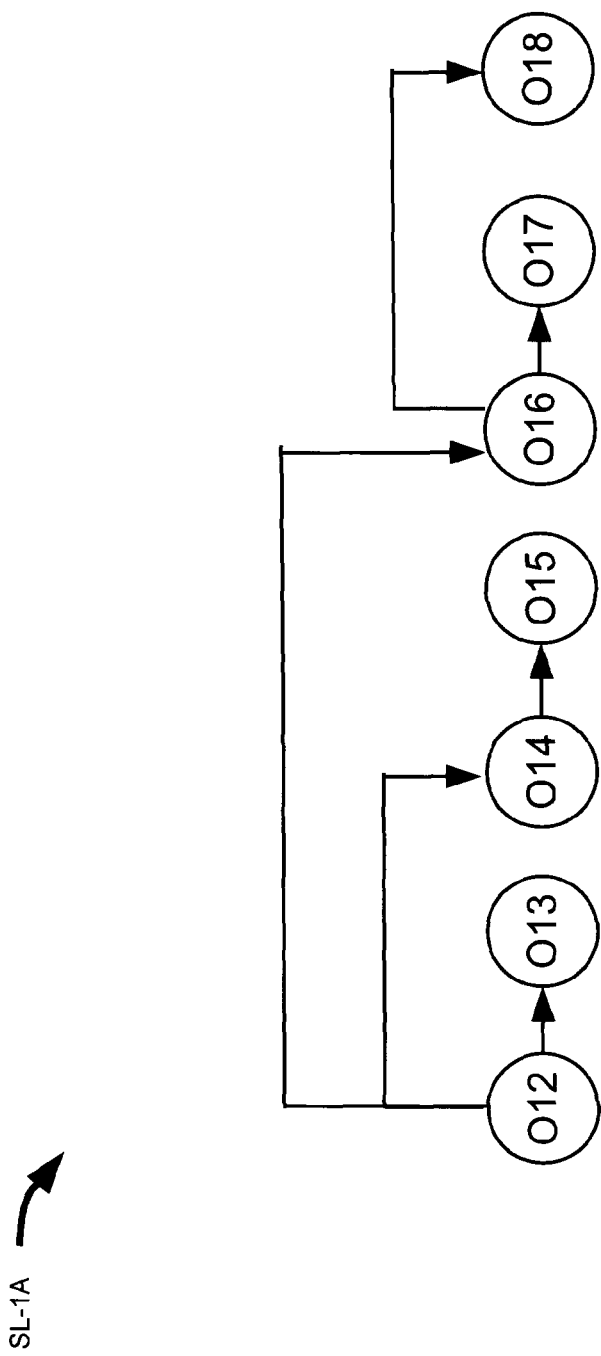
FIG. 23 shows an exemplary addition to the skip list of FIG. 22.

As another example that the components relative to interfaces 300 and plug-ins 400 as introduced in FIG. 15 can be "mixed and matched" according to any desired combination, FIG. 21 shows another simplified example, wherein skip list interface 308 is shown alone in conjunction with store 100 as being accessed by application 328, for the purpose of storing a skip list SL-1 currently being maintained in volatile storage 78. FIG. 22 shows an exemplary skip list SL-1 that can be implemented using the teachings herein. In skip list SL-1 the root is object O12 which points to objects O13, O14 and O16. Object O14 points to object O15 and object O16 points to object 17. Thus skip list SL-1 differs in structure from a B-tree. Those skilled in the art, however, will now recognize using the previous teachings herein that skip list interface 308 can be configured to work with store 100 to create a version of file 300 that reflects skip list SL-1 and, by extension, the various ways that skip list SL-1 can be stored within file 300. It is further worth noting that in FIG. 23 a new skip list SL-1A is provided, which is the same as skip list SL-1 except that object O18 has been added and that object O16 now additionally points to object O18. Assuming that a version of file 300 already exists that reflects skip list SL-1, then as object O18 is added to file 300, it is only necessary to write object O18 for the first time into a new location in file 300, and rewrite object O16 into a new location in file 300 (so that pointers to object O17 and object O18 can be provided), and to rewrite object O12 into a new location in file 300 (so that the pointer to the new location of object O16 can be provided.) Otherwise, objects O13, O14, O15 and O17 can remain active within file 300 and need not be rewritten into new locations of file 300.

(Those skilled in the art will now recognize that skip-list SL-1 is a novel skip list, as in order to be a traditional skip-list, object O13 would need to point to object O14; object O15 would need to point to object O16; and object O14 would need to point to object O16. Thus, skip list SL-1 is in fact a novel skip-list. Skip list SL-1 is therefore a novel embodiment in and of itself. Skip list SL-1 can have many uses, such as journal-based storage.)

As another example that the components relative to interfaces 300 and plug-ins 400 as introduced in FIG. 15 can be "mixed and matched" according to any desired combination, FIG. 24 shows another simplified example, wherein store 100 is shown with partition plug-in 408 and sequence plug-in 412 (which can be implemented collectively as a single plug-in referred to herein as compound storage plug-in), and in turn three different additional instances of store 100 are provided, namely store 100A, store 100B and store 100C. (Similar additional instances of read 150, commit 200 and root 250 are also provided but not shown in FIG. 24). Store 100A, store 100B and store 100C are accessible to plug-ins 408 and 412. (Note that the exact placement of each plug-in in relation to each instance of store 100 may not be exactly as shown in FIG. 24 during an actual implementation. For example, an instance of plug-in 412 could, in practice, not be implemented above store 100A, store 100B and store 100C but instead below each one of store 100A, store 100B and store 100C.) In FIG. 24, system 50 also includes three persistent storage devices 70A, 70B and 70C, each with its own respective file 300A, 300B and 300C. In this highly simplified example, file 300A, 300B and 300C each only have two locations. Therefore, in order to store four objects O1-O4 and identify one of those objects as a root, and to have an end of file marker EOF, partition plug-in 408 and sequence plug-in 412 cooperate with store 100A, store 100B and store 100C to store objects O1-O4, the root marker and the end of file marker across storage devices 70A, 70B and 70C. It can be desired to implement system 50 according to FIG. 24 when the sizes of devices 70A, 70B and/or 70C are limited and/or where it is desired to keep a long historical record of changes. A read can be effected to any one of the devices 70A, 70B, 70C. When the devices 70A, 70B, 70C become full a new device 70 can be added.

As a further enhancement, it is to be understood that partition plug-in 408 can be implemented, if desired, in accordance with the teachings of co-pending and commonly-assigned U.S. patent application Ser. No. 11/693,305 filed Mar. 29, 2007, now U.S. Pat. No. 7,680,766, the contents of which are incorporated herein by reference.

As another example that the components relative to interfaces 300 and plug-ins 400 as introduced in FIG. 15 can be "mixed and matched" according to any desired combination, FIG. 25 shows a more complex example including a plurality of separate servers remotely connected to each other, with processor 54A representing the processor of the first server; processor 54B representing the processor of the second server; and processor 54n representing the processor of the "nth" or final server; Processor 54A includes store 100, cache plug-in 402, partition plug-in 408 and remote plug-in 420 as previously discussed. Remote plug-in 420 can communicate with store 100 on processor 54B and store 100 on processor 54n. Processor 54B and processor 54n themselves each implement cache plug-in 402, partition plug-in 408 and sequence plug-in 412, which make use of two persistent storage devices 70 local to each processor 54B and 54n. The configuration in FIG. 25 highlights the highly scalable nature of the teachings herein to provide large amounts of storage capacity with transaction speeds that can be described as at least "good" and potentially much better than current commercial database solutions offered by Oracle Corporation, 500 Oracle Parkway, Redwood Shores, Calif. 94065 and others. Furthermore, such storage can be provided relatively inexpensively.

It should now be apparent that many other combinations, subsets and variations of interfaces 300 and plug-ins 400 across one or more physical servers are within the scope of the teachings herein. In general, it should now be understood also that combinations, subsets and variations of all of the embodiments herein are contemplated.

Indeed, the present novel system and method for storage can present some advantages in certain implementations. For example, the inventor has done research leading the inventor to believe that a properly configured implementation can provide disk accessing speeds of up to 1.5 million transactions per second. A still further potential advantage from a properly configured implementation where the persistent storage is based on Flash drives can ultimately lead to longer life for such Flash drives, as a properly configured implementation of certain embodiments can lead to substantially equal use of all memory locations in the Flash drive, or at least more equal use of those memory locations than the prior art. Since memory locations in Flash drives "burn out" after a certain number of uses, the useful life of such Flash drives can conceivably be extended. As a still further potential advantage, properly configured implementations of certain embodiments can provide databases where recording of changes to those databases is automatically effected.

In addition, the teachings herein can, in properly configured implementations, support Relational, object oriented, Temporal, Network (Hierarchical), Inverted-Index (search engine), Object-Relational, Geographic and other persistence paradigms which can all be combined into the same database at the same time.

In addition, teachings herein can support, in properly configured implementations, a single top-level first-in-first-out read/write queue that would suffice for an entire system. No internal synchronization would be required for read operations. This is possible because Objects are never updated, only replaced, which can provide good in-memory performance.

In addition, Compact Disk Representation of Objects can be provided using certain properly configured embodiments of the teachings herein. As known to those skilled in the art, relational databases using fixed-size rows can be very wasteful for cases where many rows are unused or usually contain a default value, or when large strings values are used to store only small values on average. The teachings herein can, in properly configured implementations, support storage of non-default values and so that only amount of string data which is actually used is stored. This can lead to significant performance and disk-space efficiency improvements.

In addition, bursty traffic can be more readily accommodated using properly configured embodiments of the teachings. Under short periods of heavy load a journal garbage collector would execute at a lower priority (or not at all), thus allowing for higher peak loads than what could normally be sustained.

In addition, properly configured embodiments of the teachings herein can provide Large Collection Support and obviate the need for a Separate Transaction Journal. This means that transactions can be easily supported without incurring the overhead normally associated with their use.

In addition, properly configured embodiments of the teachings herein can obviate Separate Clustering Channels. This means that larger clusters can be supported more efficiently. A ten fold increase over certain configurations of current clustering performance could be realized.

In addition, properly configured embodiments of the teachings herein can provide scalability because data is never updated, only replaced, there is a reduced (and possibly zero) possibility for corruption. Properly configured embodiments can be equally suitable for databases of all sizes. For small databases it can be as fast as completely in-memory systems. Large databases can be scaled in the same way as completely disk-based systems. This can allow one to code all of databases in the same way without forcing the use a different system depending on your performance or size requirements.

The invention claimed is:

1. A method for storing comprising:
receiving a write command including an object to be written;
seeking to an end of a file;
defining a write location at or adjacent to said end of file;
writing said object at said write location;
defining an object identifier associated with said write location;
redefining said end of file after said write location;
wherein said method is invoked for:
   additions of objects to said file;
   deletions of objects from said file, such that deleting a first object comprises re-writing at least a second object associated with said first object, without altering said first object; and
   changes to objects within said file.

2. The method of claim 1 further comprising writing at least one pointer in conjunction with said object; each of said pointers pointing to a respective another object in said file.

3. The method of claim 1 wherein said object identifier is said write location.

4. The method of claim 1 further comprising outputting said object identifier.

5. The method of claim 4 wherein said object identifier is outputted to an application programming interface that generated said write command.

6. The method of claim 1 further comprising:
receiving a commit command;
receiving an object identifier associated with said commit command;
appending a root marker to said file; and
defining another object identifier associated with said write location.

7. The method of claim 4 wherein said another object identifier is outputted to an application programming interface that generated said commit command.

8. The method of claim 6 wherein said object identifier is said write location.

9. The method of claim 6 wherein said appending said root marker comprises:
seeking to said end of said file;
defining a root marker write location at or adjacent to said end of file;
writing said root marker at said root marker write location;
defining an object identifier associated with said root marker; and
redefining said end of file after said root marker write location.

10. A system for storage comprising:
a processor;
a persistent storage device connected to said processor;
said persistent storage device configured to maintain a file;
said processor configured to:
   receive a write command;
   receive an object to be written;
   seek to an end of said file;
   define a write location at or adjacent to said end of file;
   write said object at said write location;
   define an object identifier associated with said write location;
   redefine said end of file after said write location; and
said processor so configured for additions of objects to said file; deletions of objects from said file, such that deleting a first object comprises re-writing at least a second object associated with said first object, without altering said first object; and changes to objects within said file.

11. The system of claim 10 wherein said processor is further configured to execute at least one application programming interface such that additions of objects to said file, deletions of objects from said file, and changes of objects to said file are effected via said application programming interface.

12. The system of claim 11 wherein said at least one application programming interface includes at least one of a file server interface; a B-tree interface; a skip list interface; a store and forward interface and a geographic interface.

13. The system of claim 11 wherein a Data Access Object (DAO) interacts with said at least one application programming interface.

14. The system of claim 11 wherein an SQL interface interacts with said at least one application programming interface.

15. The system of claim 11 wherein said processor is further configured to execute an application that interacts with said at least one application programming interface.

16. The system of claim 10 further comprising at least one of:
at least one input device connected to said processor; and
at least one output device connected to said processor.

17. The system of claim 10 wherein said persistent storage device is at least one of a hard disc drive; a redundant array of inexpensive discs ("RAID"); a removable "smart card" and combinations of the foregoing.

18. The system of claim 10 wherein said processor is further configured to execute at least one plug in such that operations on said file are intermediated by said at least one plug in.

19. The system of claim 18 wherein said at least one plug in comprises at least one of a caching plug-in, a clustering plug-in, a partitioning plug-in, a sequencing plug-in, a monitoring plug-in and a remote plug-in.

20. A non-transitory computer readable media storing a skip-list data structure; said skip-list data structure readable by a processing unit; said processing unit configured to perform operations on contents of said data structure; said skip list data structure comprising:
a plurality of objects arranged according to an ordered list, each object comprising a value in said ordered list;
said plurality of objects including (i) root object comprising a first value in said ordered list, and (ii) a plurality of child objects comprising subsequent values;
said root object comprising root pointers, including a pointer to a first of said child objects, and additional pointers to additional ones of said child objects, each of said additional pointers skipping a greater number of said child objects in said ordered list than a preceding one of said root pointers;
each of said additional ones of said child objects including at least one child pointer, said at least one child pointer pointing only one of said child objects to which said root object does not point.

* * * * *

UNITED STATES PATENT AND TRADEMARK OFFICE
CERTIFICATE OF CORRECTION

PATENT NO. : 8,805,897 B2  
APPLICATION NO. : 12/746852  
DATED : August 12, 2014  
INVENTOR(S) : Kevin Glen Roy Greer Page 1 of 1

It is certified that error appears in the above-identified patent and that said Letters Patent is hereby corrected as shown below:

In the claims

Column 14  
Claim 20, Line 16, insert --a-- after "(i)"  
Claim 20, Line 27, insert --to-- after "only"

Signed and Sealed this  
Twenty-seventh Day of October, 2015

Michelle K. Lee  
*Director of the United States Patent and Trademark Office*